United States Patent [19]

Smith

[11] Patent Number: 5,377,105
[45] Date of Patent: Dec. 27, 1994

[54] ENHANCED VERTICAL RESOLUTION PROCESSING OF DUAL-SPACED NEUTRON AND DENSITY TOOLS

[75] Inventor: Michael P. Smith, Spring, Tex.

[73] Assignee: Halliburton Logging Services, Houston, Tex.

[21] Appl. No.: 158,194

[22] Filed: Nov. 24, 1993

Related U.S. Application Data

[63] Continuation of Ser. No. 684,404, Apr. 12, 1991, abandoned.

[51] Int. Cl.$^5$ .............................................. G01V 3/00
[52] U.S. Cl. ...................................... 364/422; 73/38; 73/151; 73/152
[58] Field of Search .................... 364/422; 73/38, 151, 73/152

[56] References Cited

U.S. PATENT DOCUMENTS

| 4,535,625 | 8/1985 | Lyle, Jr. ................................. 73/152 |
| 4,760,252 | 7/1988 | Albats et al. ...................... 250/266 |
| 4,786,796 | 11/1988 | Flaum et al. ...................... 250/266 |
| 4,794,792 | 1/1989 | Flaum et al. .......................... 73/152 |
| 4,816,674 | 3/1989 | Ellis et al. ........................... 250/266 |
| 4,909,075 | 3/1990 | Flaum et al. .......................... 73/152 |
| 5,019,708 | 5/1991 | Flaum ................................. 250/264 |
| 5,282,133 | 1/1994 | Watson ............................... 364/422 |

FOREIGN PATENT DOCUMENTS

1281437 3/1991 Canada .
0267075 11/1988 European Pat. Off. .

OTHER PUBLICATIONS

"Enhanced Vertical Resolution Processing of Dual-Spaced Neutron and Density Tools Using Standard Shop Calibration and Borehole Compensation Procedures," by Michael P. Smith, SPWLA Symposium in Lafayette, La., Jun. 1990, pp. 1–22.

"Dynamic Depth Shift of the Court Rates in Compensated Neutron Logs," by R. Ramberger und K. Wagner, Tenth European Formation Evaluation, Symposium, pp. 1–15.

"CNT*-G Tool Response to Bed Boundaries," by C. R. Case, SPWLA Twenty-Third Annual Logging Symposium, Jul. 6–9, 1982, pp. 1–12.

"Enhanced Vertical Resolution Processing of Dual-Spaced Neutron and Density Tools Using Standard Shop Calibration and Borehole Compensation Procedures," by Michael P. Smith, pp. 1–21.

"Enhanced Resolution Processing of Compensated Neutron Logs," by J. E. Galford, C. Flaum, W. A. Gilchrist, Jr. and S. W. Duckett, Society of Petroleum Engineers, SPE 15541, 61st Annual Technical Conference and Exhibition of the Society of Petroleum Engineers in New Orleans, La., Oct. 5–8, 1986, pp. 1–13.

"Modelling the Spatial Response of a Compensated Density Tool," by John S. Petler, presented at 1989–IEEE meeting in Jan. 1990.

"Eliminating the Effect of Rugosity from Compensated Density Logs by Geometrical Response Matching," by C. Flaum and J. M. Olenka, Society of Petroleum Engineers, SPE 19612, 64th Annual Technical Conference and Exhibition of the Society of Petroleum Engineers in San Antonio, Tex., Oct. 8–11, 1989, pp. 419–427.

"Characterization of Vertical Resolution for PE and Density Logging," by Gary L. Mathis and Dale Gearhart, SPWLA Twenty-Ninth Annual Logging Symposium, Jun. 5–8, 1988.

(List continued on next page.)

Primary Examiner—Roy N. Envall, Jr.
Assistant Examiner—Gita D. Shingala
Attorney, Agent, or Firm—Arnold, White & Durkee

[57] ABSTRACT

A method of deconvolving the far-spaced detector response of a dual-spaced neutron logging tool, coupled with dynamic matching of the near-spaced detector response, improves the vertical resolution of the tool's formation porosity measurements. Near/far ratio processing and the standard shop calibration procedure are retained to continue to provide accurate, borehole compensated formation porosity measurements.

27 Claims, 12 Drawing Sheets

OTHER PUBLICATIONS

"Enhanced Vertical Resolution Processing of Dual Detector Gamma–Gamma Density Logs", by C. Flaum, J. E. Galford, SPWLA Twenty-Eight Annual Logging Symposium, Jun. 29–Jul. 2, 1987, pp. 1–25.

"The Stabilized Deconvolution of Dynamic Curves in Nuclear Well Logging," by Thomas Zorski, Acta Geophysical Polonica, vol. XXXVII, No. 1, 1989, pp. 95–109.

"Discrete Fourier Transform Applied to the Inverse Problem in Gamma-Ray Log When the Noise is Present," by Tamsz Zorski, Acta Geophysical Polonica, vol. XXXI, No. 4, 1983, pp. 405–424.

"Improved Resolution of Nuclear Well Logs," by J. A. Quirein, C. C. Prudy, Mobil, Dallas, Tex. date unknown, but believed to be prior to Apr. 12, 1991.

"Resolution Enhancement of Nuclear Measurements Through Deconvolution," by L. A. Jacobson, D. F. Wyatt, Jr., L. L. Gadeken, G. A. Merchant, SPWLA Symposium in Lafayette, La., Jun. 1990.

"A Matched Filter Data Smoothing Algorithm," by L. A. Jacobson, Gearhart Industries, Inc., Austin, Tex., date unknown, but believed to be prior to Apr. 12, 1991.

"Deconvolution of Petrophysical Logs: Applications and Limitations," by S. J. Looyestijn, SPWLA Twenty-Third Annual Logging Symposium, Jul. 6–9 1982, pp. 1–20.

"Inversion of Well Log Data by the Method of Maximum Entropy," by C. J. Dyos, Tenth European Formation Evaluation Symposium, date unknown, but believed to be prior to Apr. 12, 1991.

"Remarks on the Iterative Smoothing and Deconvolution of Data Sequences," by Charles C. Watson and Darwin V. Ellis, Schlumberger-Doll Research, Sep. 27, 1989.

"Deconvolution and Windowing—A Technique to Improve the Vertical Resolution for Nuclear Tools," by C. C. Fu, S. Gianzero and D. Torres, date unknown, but believed to be prior to Apr. 12, 1991.

"Induction Vertical Resolution Enhancement—Physics and Limitations," by Thomas D. Barber, SPWLA Twenty-Ninth Annual Logging Symposium, Jun. 5–8, 1988.

"Real Time Frequency Domain Filtering Maximizing Vertical Resolution While Minimizing Noise," by D. Torres, M. Alberty and C. Jackson, SPWLA Twenty-Ninth Annual Logging Symposium, June 5–8, 1988.

"Deconvolution," by Manual T. Silvia, pp. 741–788, Handbook of Digital Processing, published 1987.

"Application of Time–Series Analysis to Wireline Logs," by Sandra J. Kerford and Daniel T. Georgi, date unknown, but believed to be prior to Apr. 12, 1991.

"A New Resistivity Measurement System for Deep Formation Imaging and High-Resolution Formation Evaluation," by J. F. Hunka and T. D. Barger, Society of Petroleum Engineers, SPE 20559, 1990, pp. 295–307.

"Advances in Evaluation Thin-Bed Reservoirs," by Gerald W. Allan and James G. McDougall, Atlas Wireline Services, Western Atlas Canada Ltd., Calgary, Alberta, data unknown, but believed to be prior to Apr. 12, 1991.

"High-Resolution Logging: The Key to Accurate Formation Evaluation," by D. C. McCall, D. F. Allen and J. S. Culbertson, Society of Petroleum Engineers, SPE 16769, 1987, pp. 283–298.

"Strategies for Thin-Bed Forma," by Charles Flaum, David Allen, Mario Cafiero, Stephen Cheshire, Oilfield Review, pp. 28–42.

"Deconvolution of Well Log Data-An Innovation Approach," by W. D. Lyle and D. M. Williams, The Log Analyst, May–Jun., 1987, pp. 321–328.

"Quantitative Uranium Determinations from Gamma-Ray Logs By Application Of Digital Time Series Analysis," by J. G. Conaway and P. G. Killeen, Geophysics, vol. 43, No. 6, Oct. 1978, pp. 1204–1221.

NEAR AND FAR RESPONSE
VOLUMES DEPTH-ALIGNED BY
SURFACE COMPUTER

NEAR SMOOTHED
TO MATCH FAR

ENHANCED VERTICAL RESOLUTION PROCESSING OF DUAL-SPACED NEUTRON AND DENSITY TOOLS

This application is a continuation of application Ser. No. 07/684,404, filed Apr. 12, 1991, now abandoned.

BACKGROUND OF THE INVENTION

The present invention relates to a method of improving the quality of dam obtained by logging a borehole and, more particularly, to a method of enhancing the vertical resolution of well logging data.

Dual-spaced neutron and density logging tools, using ratio processing and spine and rib plots, respectively, provide borehole compensated formation porosity measurements. The effects of washout, mudcake, rugose boreholes, and tool standoff are thereby minimized. Standard shop calibration procedures insure porosity measurement accuracy.

The preprocessing (or preliminary) operations of depth alignment and material matching are critical for accurate borehole compensation with dual detector logging tools; these operations also eliminate horns or spurious beds on logs. These preliminary operations involve material matching to improve accuracy and repeatability, but at the cost of degraded vertical resolution. Because of present limitations on the far neutron source-to-detector spacing, it is not possible to achieve a vertical resolution of better than about two feet while maintaining material matching using simple filtering methods.

During the past several years, new data processing methods have been developed to improve the vertical resolution of both neutron and density logging tools. For example, the near detector log profile from each tool is used (separately) to alter the vertical profile of the original borehole compensated log to thereby improve vertical resolution. These processing methods require modifications to standard shop calibrations of both tools. Although bed resolution appears to improve, statistical precision and/or log repeatability is degraded and porosity accuracy in rugose boreholes is compromised.

SUMMARY OF THE INVENTION

The present invention includes a new method for improving vertical resolution while maintaining exactly the same borehole compensation procedures and shop calibrations for both neutron and density tools. The present method is called enhanced vertical resolution (or EVR) processing. Material matching includes gamma ray, neutron, and density measurements. A new compromise between vertical resolution (12-15 inches) and log repeatability is possible for many logging applications.

The new method improves the vertical resolution of the far neutron detector by deconvolution data processing methods. The effective neutron migration length (M*) is used to construct the vertical response function (VRF) for the far detector that is used to deconvolve (or sharpen) the far detector log. M* is also used to compute a smoothing function for the near detector to obtain and maintain a material match to the deconvolved far detector log. Standard ratio calibration and processing are still used. Both forward modeling and deconvolution results can be verified with the API standard neutron test pit (at the University of Houston), the industry accepted neutron log calibration standard. Filtering of the near and far density count rates can then be reduced to maintain vertical resolution compatibility (i.e., material matching) with the improvements made in the neutron tool response. Simple block filters continue to be used for the density tool. Current, fixed shop calibrations and standard spine-and-rib processing are retained for the density tool. Finally, the natural gamma ray logging data is materially matched to data from the neutron and density tools. Thus, material matching is achieved separately for the dual spaced neutron and density tools, and the natural gamma ray tool; finally material matching is achieved for all of these tools collectively.

By use of various examples, the process is presented in detail. Standard and enhanced resolution processing are compared to show the resolution improvements. A comparison and analysis of selected log sections is provided.

While it has been possible to provide enhanced resolution processing by replaying telemetry tapes, these novel methods are readily adapted to work in real time or relog operations at the well site, operating with any specific dual-spaced neutron of density logging tool.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 190 is a view showing a different test bed with EVR processing compared with standard processing.

DETAILED DESCRIPTION OF THE PREFERRED EMBODIMENT

Standard preprocessing refers to operations performed on logging data before typical bulk density, neutron ratio, borehole compensation, porosity computations, etc. are performed; important examples include time-to-depth basis conversion, depth alignment, material matching, and application of the current shop calibrations.

Figure 1:
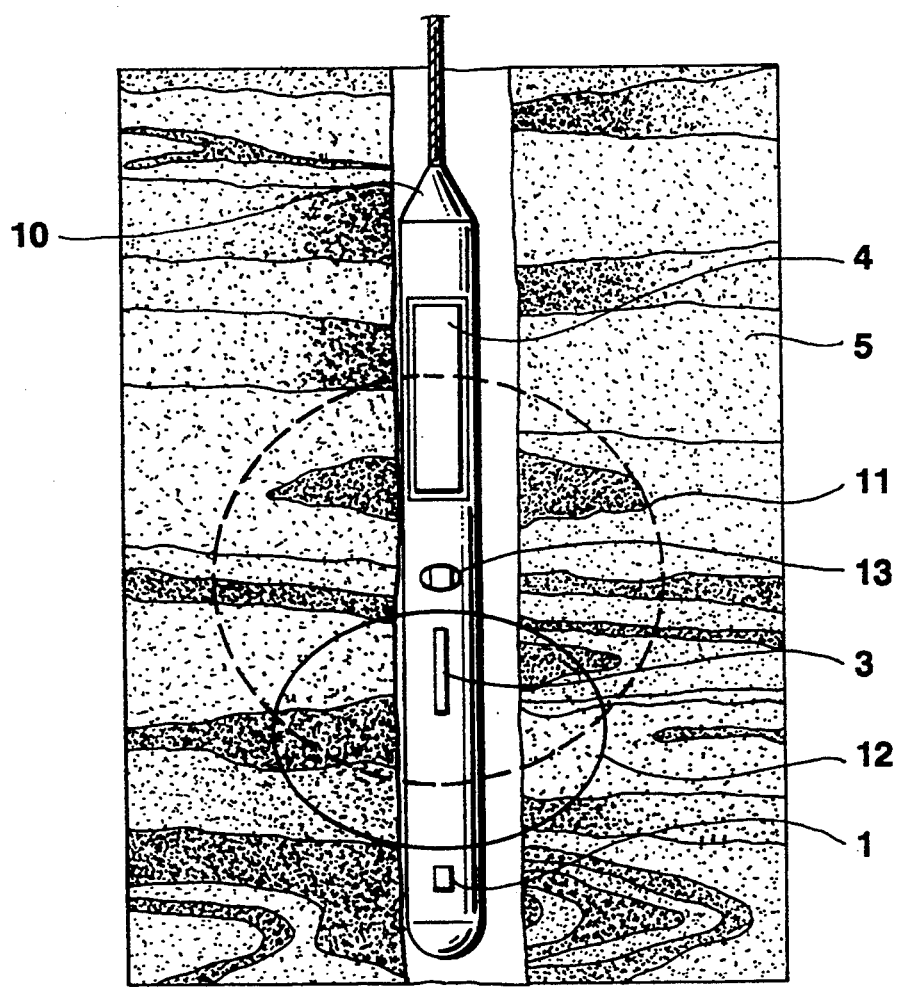
FIG. 1 shows a sonde supported in an uncased well borehole and illustrates near and far response volumes investigated by the near and far detectors and further shows it neutron source in the sonde.

FIG. 1 shows (in schematic fashion) near and far detector response volumes for a dual-spaced neutron logging tool 10 at one instant of time at a fixed position in a well bore. As the fast neutrons leave the source 1 in the tool 10 and slow down and diffuse, in the formation/borehole region 5, they sample the materials between the source and each detector. A large portion of the measured near and far count rates is determined by the borehole and formation material contained within these response volumes. These far and near response volumes 11 and 12 are not equal in size and each may contain materials not found within the other. An analogous diagram applies to a dual-spaced density logging tool, except that its detector responses are focused into the formation, and away from the borehole axis. The instrumentation converts all the instantaneous nuclear count rates from a time basis to a depth basis at a fixed sample rate of 2 to 10 times per foot, typically by a known and simple averaging process. Here, a sample rate of four per foot or every three inches is assumed.

Figure 2:
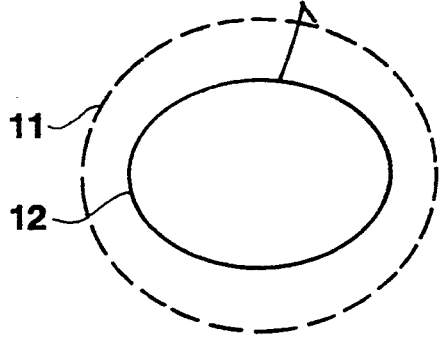
FIG. 2 shows the near and far response volumes after alignment whereby shifting occurs in handling of the data.
Figure 3:
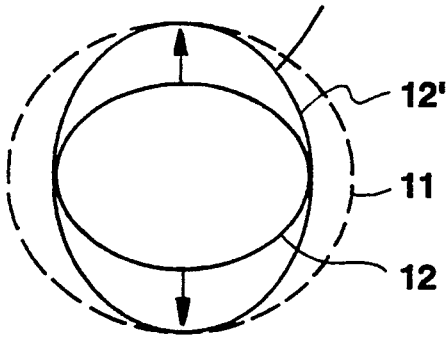
FIG. 3 shows the near and far response volumes of FIG. 2 with the near volume stretched/smoothed so that both volumes investigate the same vertical extent of formation material.

FIGS. 2 and 3 illustrate two important preprocessing operations, namely depth alignment and material matching of the neutron (or density) near and far count rates. These operations insure that both detectors 3, 4 sense the same vertical extent of formation material before any additional processing is performed. In these views, the near and far count rates are referred to a fixed (imaginary) point 13 called the fixed measure point 13. These two operations are basic for both standard and enhanced processing of dual-spaced neutron and density logging tools. Returning to FIG. 1, an example of the fixed measure point 13 has assumed that no other tool measurements exist. The total string measure point for all tool sensors may actually lie on or beyond the physical limits of the sonde.

The material matching operation (FIG. 3) smooths the near detector response so that it matches the far detector response primarily in vertical extent. Thus, FIG. 3 shows a modified near volume 12' which is shaped to have the common diameter vertically matching the far volume 11. This operation is vital to obtain proper borehole compensation through the use of two detectors and also to achieve accurate results at bed boundaries since the failure to do so will cause unwanted horns or extra beds to appear. These beds can be an insidious problem since they may be repeatably found on both neutron and density logs, and yet they may not be real. Simple block filters have been used to smooth the near neutron count rate to match the far count rate. The exact amount of smoothing of the near detector response for both neutron and density tools using block filters (or more complex filters) must be verified experimentally, using test tank and well logging data. This smoothing depends on acquisition sample rates; source to detector spacings; and especially for neutron tools, formation porosity. Material matching of dual-spaced detector logging tools thus degrades the near detector vertical resolution, this despite the fact that the near detector 3 has much better vertical resolution and typically much higher count rates and hence better statistical precision and log repeatability than the far detector 4 of the tool.

Figure 4:
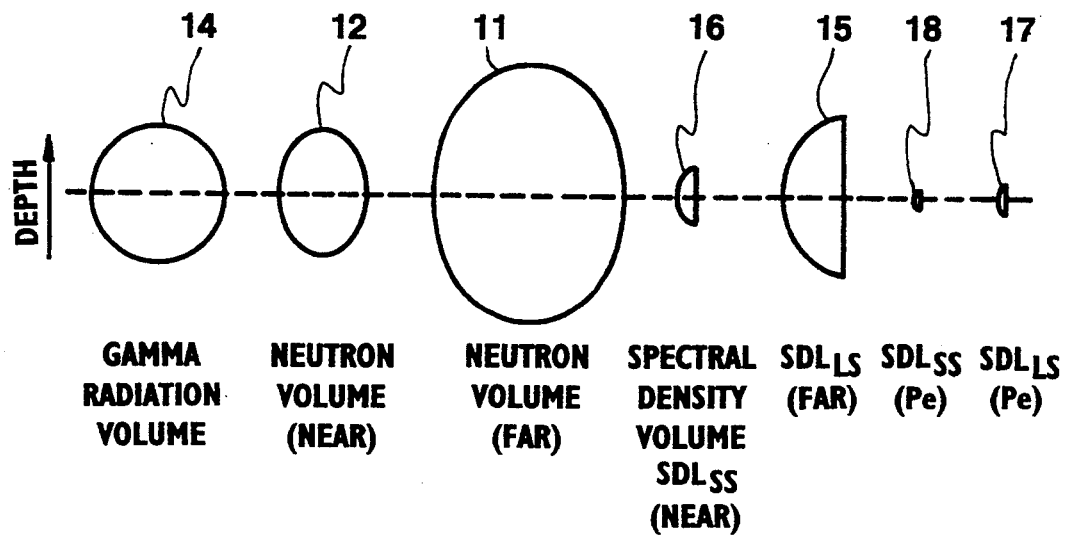
FIG. 4 shows different size response volumes for different investigative tools supported in a common sonde.

FIG. 4 of the drawings shows representative vertical response volumes for the standard nuclear logging tools. These volumes have been depth aligned to correspond to the measuring point of the sonde 10 analogous to that shown at 13 in FIG. 1. In other words, the particular volumes represented in FIG. 4 are aligned with respect to their different locations along the tool body length, but they still show a disparity resulting from differences in response volumes. The numeral 11 identifies the far neutron detector response volume. That volume is, in part, defined by the size of the far detector 4 and its spacing relative to the neutron source 1 in the tool 10. That volume can be reduced in size by moving the far detector 4 closer to the neutron source 1 but this involves a trade off which is not necessarily advantageous. If the volume 11 is made larger, the more remote portions of the volume 11 will experience a reduced neutron flux and the data will have less repeatability. That also involves another trade off. Accordingly, with many factors involved in trade offs, the volume 11 is first defined and is, in large part, a function of the geometry of the tool and the location of the neutron source 1 and the far detector 4. As will be seen, the far neutron detector response volume 11 is also strongly dependent on formation porosity, being much larger at low porosities than at high porosities. The near detector volume 12 is also shown in FIG. 4. It also is, in part, dependent of neutron flux density and spacing the near detector 3 relative to the source 1. Because the near detector 3 is closer to the source 1 the flux density is much higher.

This also, however, involves certain trade offs which ultimately define the volume 12. The near and far neutron detector sizes and spacings are chosen to optimize the measurement of formation porosity and to minimize variations in borehole conditions such as diameter and rugosity and variations on tool standoff. For completeness, FIG. 4 also shows the response volumes for the photoelectric (Pe) measurements provided by the dual-spaced spectral density tool.

Assume, for purposes of description, that the volume 11 has a vertical height of two feet. It is then necessary to treat the data for the volume 12 so that the volume 12' has a vertical height, as shown in FIG. 3, which matches the volume 11. If this is done, then the volumes 11 and 12' are derived from the same vertical extent of formation and represent the same volume of formation materials provided the formations are horizontally uniform. When they detect the same vertical interval, comparisons then can be made using the respective data, using ratio processing (or other types of processing).

Going now to FIG. 4 of the drawings, it will be observed that the volumes 11 and 12 are inherently different in size. Not only that, there is an additional volume of note, namely the gamma radiation material volume 14. It has a different volumetric extent also. This volume is the volume of the region which is involved by a gamma radiation detector which is normally located in the same sonde 10. As will be understood, the sonde 10 is not exclusively devoted to the neutron detectors which investigate the volumes 11 and 12. Hence, the volume 14 inspected by, or tested by, the gamma radiation detector is also included under the assumption that such a tool is located in the sonde 10. While the sonde may support only a single tool, the normal construction is to install multiple tools within a common tool body. The sonde 10 therefore has numerous tools in it. One tool is the dual-spaced neutron detector system and another tool is the natural gamma radiation detection system. A third type of tool typically included is the dual-spaced spectral density logging tool. Therefore, FIG. 4 shows another set of material volumes at 15 and 16. Again, this is a two detector system as is well known which provides measurements within the two volumes 15 and 16. Again, they differ in size as the result of geometry of the tool primarily relating to the location of the short spaced and long spaced detectors. The tool additionally includes Pe measurements with much smaller volumes 17 and 18.

In a typical tool construction, the volumes 11, 12, 14, 15, 16, 17 and 18 may vary from a maximum size of about twenty-four inches for the volume 11 to the volume 18 which might be as small as three inches. Usually, three different types of tool are supported in the sonde 10 including the neutron logging tool, the natural gamma radiation detector and the special density logging tool. They are all housed or positioned in the common sonde 10 and the data obtained by the three respective tools are shifted to a fixed measuring point to achieve alignment so that the data from a particular strata can be matched against other measurements for that same strata.

COMPATIBLE GAMMA RAY, DENSITY, AND NEUTRON LOGGING MEASUREMENTS

Figure 5:
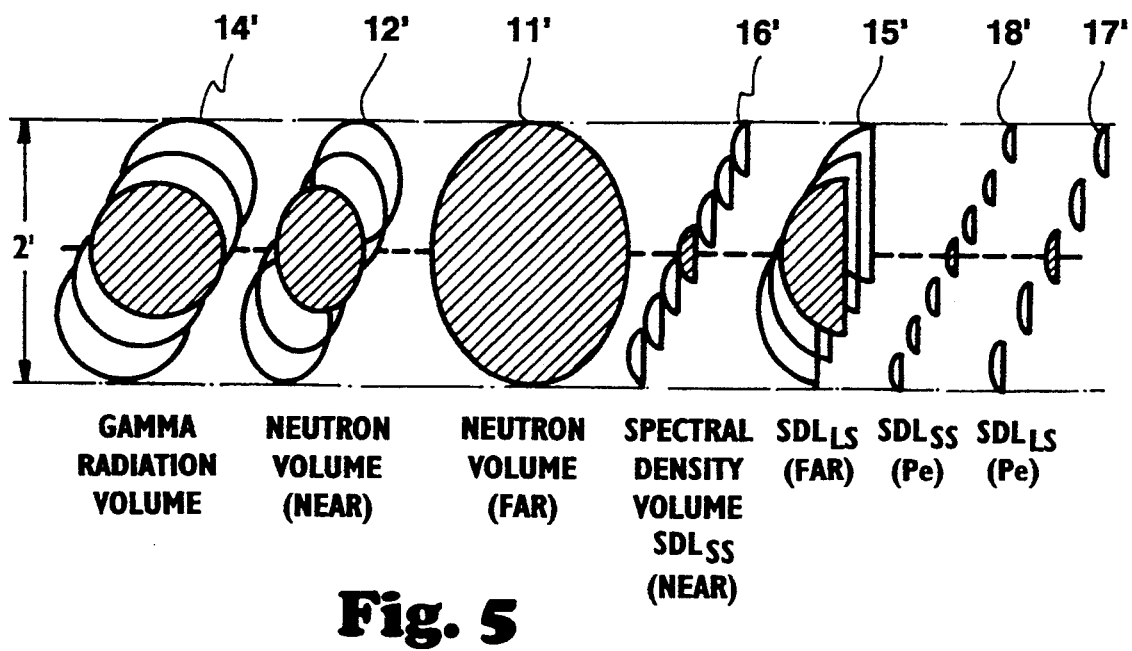
FIG. 5 is a view similar to FIG. 4 but with more depths, showing overlapping response volumes corresponding to the smoothing/filtering that is done to achieve a material match.

It is often important to insure that these measurements are simultaneously material-matched for all three logging tools creating logs of the borehole so all measurements for all tools respond to the same vertical formation extent. In this case, it becomes necessary to smooth the gamma ray detector, short-spaced neutron detector, and the spectral density detector measurements to match the assumed twenty-four inch vertical extent of the far neutron detector measurement. FIG. 5 shows how different vertical response intervals are dealt with so that they can be brought to a common vertical extent. A material match is accomplished. Given the tool geometry which suggests a minimum vertical response volume of about two feet (see the volume 11), the volume 12 is changed into a modified volume or the volume 12', mentioned above. In like fashion, this is accomplished for the volumes 14, 15, 16, 17 and 18 which become respectively the volumes 14', 15', 16', 17' and 18'. In other words, the volume 14' has a common vertical extent matching that of the volume 11, or two feet in this particular instance. This requires conversion of a sequence of data from the natural gamma radiation tool so that each data is summed through a smoothing filter to thereby yield the vertical extent necessary. This requires dealing with the data which is obtained for the volumes $14_1, 14_2, 14_3, \ldots 14_N$ where N is a whole number integer describing the sequence of gamma radiation logging data. Each data is obtained as the tool moves along the borehole; each data involves a different formation volume as the tool 10 moves. As mentioned, this is accomplished by the filtering which is set forth below in Table 1. Table 1 includes three sets of block filters which are light, medium, and heavy compatible filters to provide a different amount of filtering should this become necessary. Although heavier filtering reduces vertical resolution, it does improve statistical precision and/or log repeatability. Currently popular standard filtering uses a medium resolution of 33–36 inches. The best resolution that can be achieved with standard filtering is light filtering with a resolution of about 21–24 inches.

These compatible measurements (the near and far outputs) are then available for application of the current shop calibrations; to compute such variables as neutron ratio, bulk density, porosity. Compatible filtering insures the accuracy of these procedures and eliminates spurious beds or artifacts from being produced on logs to perform standard borehole compensation procedures. Compatible gamma ray, neutron, and density measurements, when input to modeling software for reservoir volumetric analyses, insure the accuracy of these analyses; false shows for gas and spurious lithology changes are minimized or eliminated.

ENHANCED RESOLUTION PROCESSING OF TYPICAL LOGGING MEASUREMENTS

Review of Table 1 and FIGS. 4 and 5 clearly indicates that the vertical resolution of compatible measurements for a selected set of nuclear tools is controlled by the neutron far detector vertical response interval which is 24 inches in the representative system. Furthermore, consider compatible measurements with a vertical resolution target of 12 to 15 inches which would require much less filtering for all the other measurements provided the neutron tool far detector measurement resolution was reduced to about one half of its natural or inherent resolution. Of course, the repeatability of such measurements would likely be somewhat reduced.

A new method has in fact been developed for obtaining neutron far detector measurements with a vertical resolution of 12 to 15 inches by using the effective neutron migration length (M*) to deconvolve the far detector count rate. M* is also used to smooth the near count rate to keep both detectors materially matched. The smoothed near detector rate and deconvolved far rate provide a deconvolved near/far ratio with enhanced vertical resolution. The same shop calibration constant and borehole compensation methods are used with this enhanced ratio to compute a neutron porosity with improved vertical resolution. At the same time, the filtering of the natural gamma ray and all the near and far density tool count rates is reduced to be compatible with these improved neutron porosity values. Standard shop calibrations and borehole compensation methods are retained for the density measurements.

As mentioned above, performance of the present system relates to the effective neutron migration length (M*) which is a function of several components. Thus, the total neutron migration length M depends on the neutron slowing down length ($L_s$), the thermalizing length ($L_e$) and the thermal diffusion length L. The relationship is given by:

$$M^2 = L_s^2 + L_e^2 + L^2 \quad (1)$$

In the foregoing, L is given by $(D/\Sigma_a)^{\frac{1}{2}}$ where $\Sigma_a$ is the total thermal neutron absorption cross section and the thermal neutron diffusion coefficient D is given by Equation 2:

$$D = \frac{1}{3[\Sigma_a + \Sigma_s(1-\mu)]} \quad (2)$$

In the foregoing, $\Sigma_s$ is the total thermal neutron scattering cross section and $\mu$ is the cosine of the mean scattering angle at the thermal neutron energy level. It is suggested that determinations of the total neutron migration length M find support in the literature.

Review of data for a multitude of formations showed that there is a relationship whereby L*=0.66L. Working this empirical observation into Equation 1, one obtains a modified version of Equation 1 wherein M* is provided so:

$$M^{*2} = L_s^2 + L_e^2 + L^{*2} \quad (3)$$

or, the same form as Equation 1. L* is called the effective thermal neutron diffusion length. There is a strong correlation between the value of M* and the count rate ratio R from the detectors to the dual-spaced neutron logging tool. This correlation appears to be independent of fluid salinity, formation boron content, and lithology and suggests that M* is the formation migration length of interest in modeling the dual-spaced thermal neutron tool ratio response. Accordingly, L* and M* are called the effective thermal neutron diffusion and migration lengths respectively. In value. M* is between $L_s$ and M and represents the phenomena whereby the detector responds to neutrons subsequent to slowing down but prior to absorption in the formation. It has therefore been discovered that M* describes the neutron detector ratio best of all. As before, the symbols used are:

$L_s$ is the fast neutron slow down length corresponding to the neutron energy interval of 4.6 MeV to 1.46 eV;

$L_e$ is the slow neutron thermalizing length, corresponding to the neutron energy interval 1.46 eV to 0.025 eV; and L is the thermal neutron diffusion length corresponding to the mean thermal energy of 0.025 eV.

Figure 6:
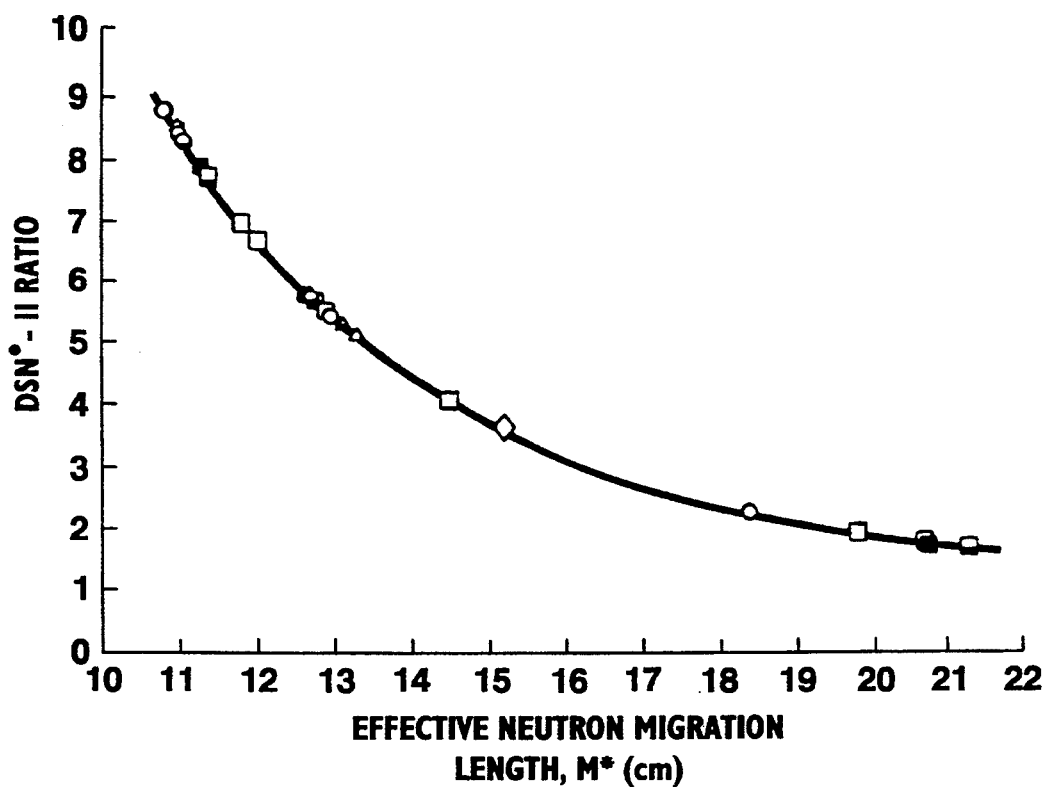
FIG. 6 shows the correlation between the ratio of the near to far neutron detector count rates and the effective neutron migration length M*.
Figure 7:
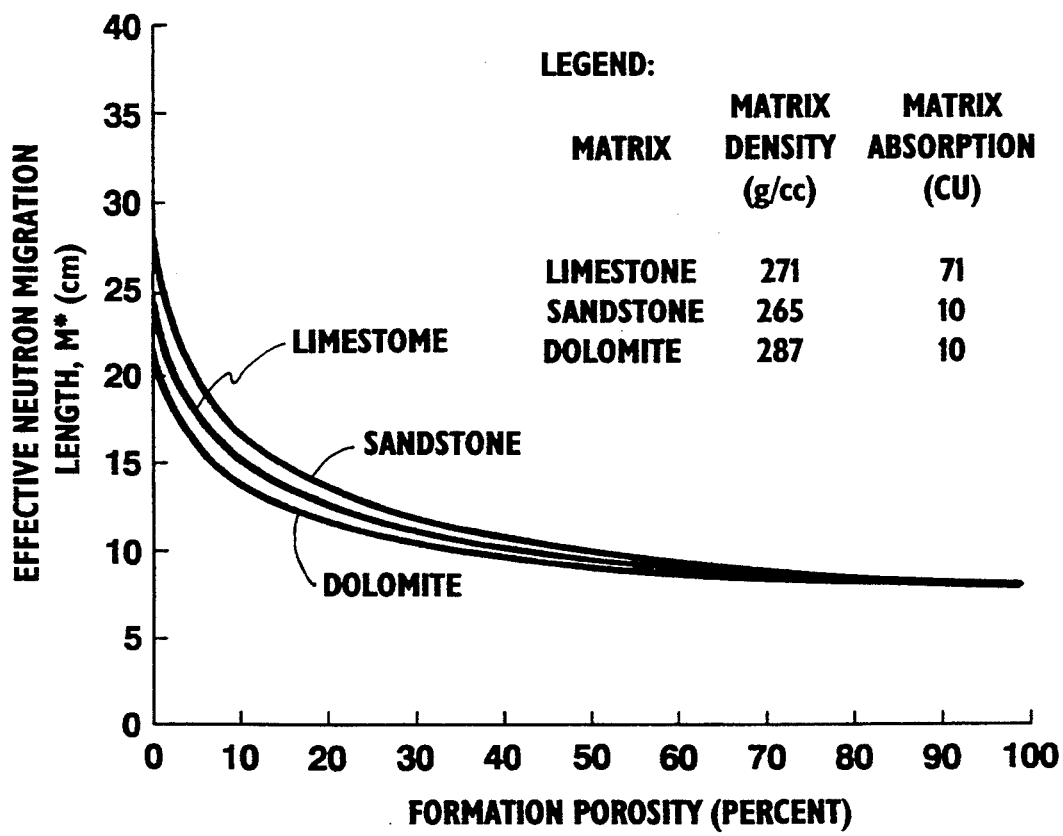
FIG. 7 is a plot of neutron migration length M* versus formation porosity for different formation minerals.

FIG. 6 shows the strong correlation between dual-spaced neutron near/far ratio and M* for a variety of formations with a very wide range of lithologies and fluid types. However, M* or ratio R alone cannot define formation porosity; this is clearly demonstrated in FIGS. 7 and 8. As with dual-spaced density logging tools, both lithology and fluid hypotheses are generally required to determine formation porosity from the basic tool responses.

M* is related to the mean distance neutrons travel in earth formations; neutron average travel distance is 2M*, with a one standard deviation spread in this value $2^{\frac{1}{2}}M^*$. Then the total mean distance T traveled is given by:

$$T^2 = (2M^*)^2 + (2^{\frac{1}{2}}M^*)^2 = 6M^{*2} \quad (4)$$

Neutrons spread much further at low porosities than at high porosities because porous materials normally are filled with hydrogen (water) which strongly slows down fast neutrons and absorbs thermal neutrons.

M* AND THE NEUTRON FAR DETECTOR VERTICAL RESPONSE FUNCTION

Figure 9:
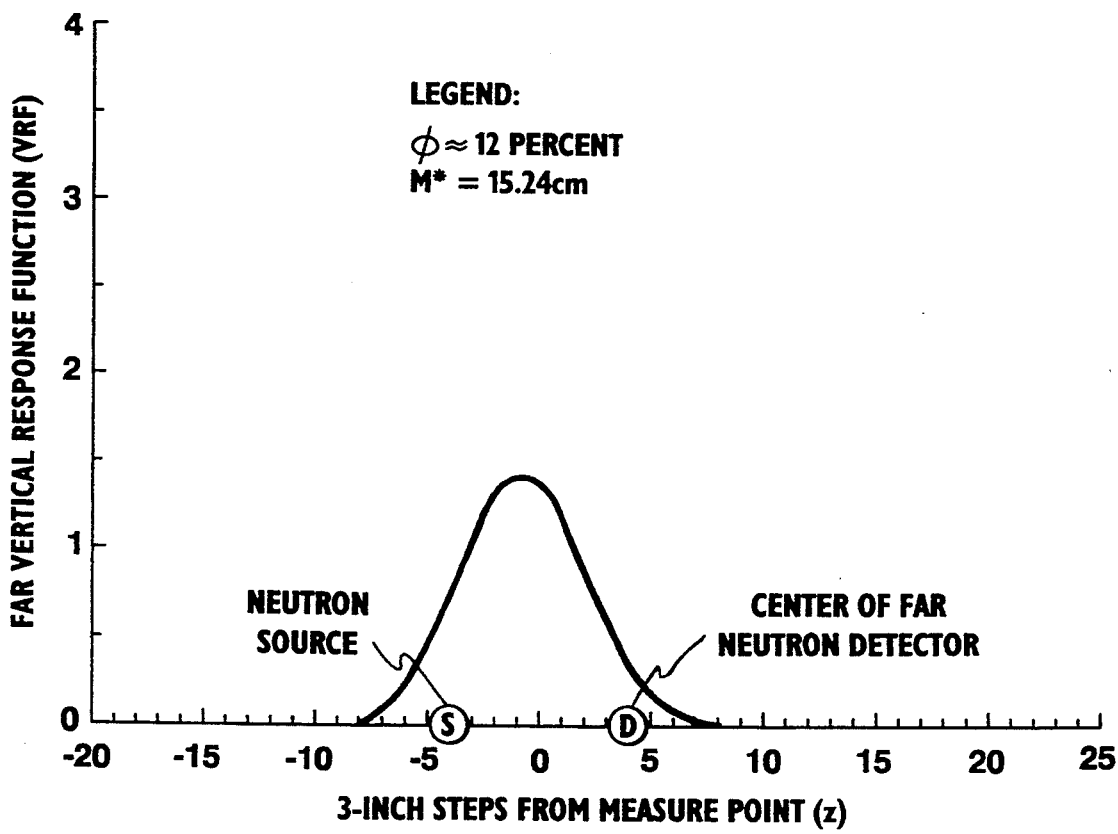
FIG. 9 is a plot of the vertical response function (VRF) of the far neutron detector versus distance along the well bore for a single (fixed) porosity.

Because of the strong correlation between near/far neutron detector ratio R and M* and the association of M* with the mean squared distance traveled, it is natural to use M* to describe the vertical extent of the neutron far detector response. Although a completely accurate description of this response remains elusive, actual logs support the concept that it is nearly symmetrical about the fixed measure point 13, which is electively located at a location between the center of the source and the center of the far detector. The equivalent Gaussian approximation states that the neutron far detector vertical response function (VRF) is given by:

$$VRF = (4\pi)^{-\frac{1}{2}}(M^*)^{-1}[-(Z+L_o=2M^*)^2/(4M^{*2})] \quad (5)$$

where Z is distance from the fixed measure point 13 and Lo is the distance from the center of the neutron source to the fixed measure point 13, or 12 inches in a common version of equipment. The distribution (Equation 5) has a mean of 2M* and a standard deviation of $2^{\frac{1}{2}}M^*$, just as for T discussed previously. As will become clear in later discussions, the algorithm whereby M* is computed is an important companion to expression 5. Suppose that the apparent limestone porosity is 12% and that M* is 15.24 cm from FIG. 7. Then as shown in FIG. 9, the VRF is symmetrical about the fixed measure point 13. Note the positions of the source and detector in this view which are 24 inches apart, at −12 and +12 inches, respectively. The mean distance traveled is 2M* or 12 inches; the one standard deviation spread about this distance is $2^{\frac{1}{2}}M^*$ or 21.55 cm or 8.5 inches.

Figure 10:
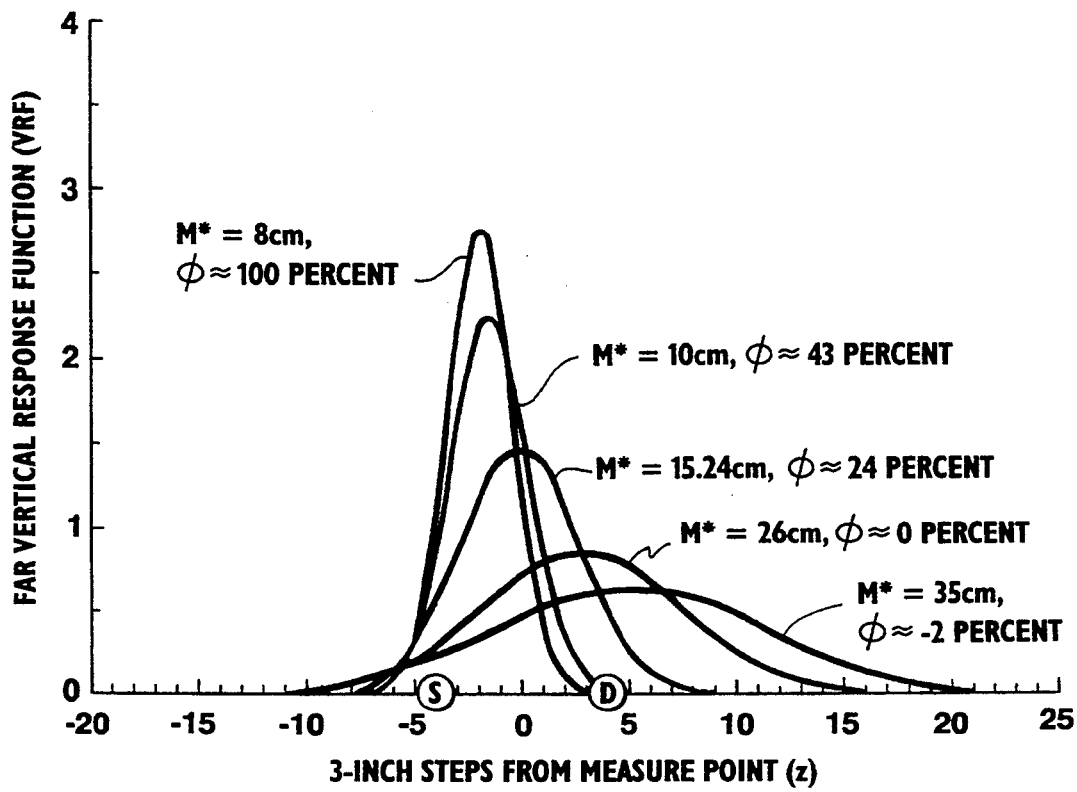
FIG. 10 is a view similar to FIG. 9 showing different curves for different neutron migration lengths and different formation porosities.

FIG. 10 shows how the VRF varies as M* changes from 8 cm to 35 cm and the apparent limestone porosity varies from 100% to −2%. As M* increases beyond 15.24 cm and the apparent limestone porosity decreases below 12%, the VRF symmetry about the fixed measure point 13 is lost, its maximum value shifts uphole away from the neutron source, and the VRF becomes more diffuse. Conversely, as M* decreases below 15.24 cm and the apparent limestone porosity increases beyond 12%, the symmetry about the fixed measure point is again lost, the VRF maximum shifts downhole towards the source 1, and the VRF becomes more well defined spatially. These features correspond to the classical picture of neutron spreading with porosity: at high porosities, the neutrons are confined close to the source 1 and observed count rates are low; conversely, at low porosities, the neutrons spread further from the source 1 and higher count rates are observed. To these basic observations, the VRF adds the promise of better vertical resolution at higher porosities and, conversely worse vertical resolution at lower porosities, provide statistical precision can be maintained.

With reference to the foregoing discussions of response volumes, two fundamental properties of the far detector response volume 11 become evident: both its size and its centroid shift significantly as formation properties (especially water filled porosity) change. These two key properties are distinctive features of the neutron far neutron detector response volume 11; i.e., the gamma ray and SDL (near and far) response volumes remain relatively fixed as formation porosity, lithology, and fluid type change; even the neutron near detector response volume 12 remains nearly symmetrical about the fixed measure point 13.

NORMALIZATION AND OTHER FEATURES OF THE VRF

The VRF is normalized to unity so that it represents the relative strength with which the combined source 1 and far detector 4 sample earth formations. In actual logging applications, values of the VRF are needed only for several discrete values of Z corresponding to the depth sampling rate. For example, if the depth sampling interval is 3 inches along the well, then Z takes on the values of ... $-9, -6, -3, 0, 3, 6, 9$ ... and so the values of the VRF evaluated at a 3-inch data sampling rate (where $J = -20, -19 \ldots 1, 1, 2 \ldots 20$), must satisfy the normalization condition:

$$VRF(-20) + \ldots + VRF(-1) + VRF(0) + VRF(+1) + \ldots + VRF(+20) = 1 \qquad (6)$$

The range of J (from $-20$ to $+20$ at a three inch spacing) is about ten total feet which is sufficient to encompass the movement of the VRF in most earth formations, i.e., where $M^* = 8$ cm to $M^* = 35$ cm, as in FIG. 10. For example, the notation $VRF(-2)$ represents the value of the VRF at a distance of $-2$ times three inches or $-6$ inches from the measure point 13 towards the neutron source. If the logging direction is upwards, then $VRF(+J)$ is to be used with newer data uphole from the measure point, whereas $VRF(-J)$ is to be used with older data downhole from the measure point, or towards the neutron source. Once a value for $M^*$ has been obtained, then the discrete values of the VRF are computed using Equation (5) and then Equation (6) is enforced before the VRF is used. This normalization procedure must be repeated at every step of the well.

The VRF is used to handle two different problems with completely different objectives and algorithms for computing the effective migration length $M^*$. One aspect is bed definition. During logging, $M^*$ may be first estimated from the standard preprocessed near/far detector ratio R and the normalized VRF is then used to deconvolve the neutron far detector response, i.e., to improve vertical resolution and thereby to more accurately determine the underlying beds that produced the recorded log.

This leads to a second and derivative problem. If a complete physical and chemical analysis of beds in a formation is a priori known in suitable data increments, a macroscopic mixing rule may be used to determine $M^*$ and then the normalized VRF is determined and used to predict the neutron far detector log response. This forward modeling assists in the goal whereby forward modeling is able to predict neutron log responses to formations composed of any combination of beds, each of which contains mixtures of any minerals and any fluids.

FORWARD MODELING APPLIED TO THE STANDARD API NEUTRON TEST PIT FACILITY

The VRF can be combined with a chemical/physical analyses of the limestone and freshwater formations that comprise the standard API neutron test pit facility at the University of Houston to predict the dual-spaced neutron far detector log response. The predicted log can then be compared with the actual recorded log to establish the validity of Equation 5 for the VRF. Such standard facilities have been used for years as the primary neutron log calibration standard for thick beds and are useful for the present benchmarking of processing methods for thin beds.

One test facility has four formations, each of which is six feet thick and are Austin chalk, Indiana limestone, Carthage marble, and 100% freshwater, with respective average porosities of 26%, 19%, 2%, and 100%. Each of the rock formations is made of six one-foot slabs. These slabs are further subdivided into imaginary 3-inch beds. Stationary measurements made near the center of each of the four formations are routinely used to establish and verify the ratio/porosity transform (FIG. 8) for thick beds. These same measurements may also be used to establish an empirical relationship between far detector count rate and porosity at standard borehole conditions. This relationship in turn permits an assignment of a theoretical, vertically infinite count rate to each three inch bed derived from measured porosity data obtained during facility constructions. These count rates are listed in Table 2 and shown in FIG. 11 (see curves labelled "the beds" or "the truth").

Denote by BEDS(I) these theoretical count rates. The VRF(J), when convolved with these count rates, produces the predicted neutron far detector log:

$$\text{PREDICTED FAR (I)} = \sum_{J=-20}^{+20} VRF(J) \cdot BEDS(I + J) \qquad (7)$$

In this way, the VRF is seen simply as a filter applied to the underlying beds that produces a far detector log prediction. One question which arises is how to determine $M^*$ for use in this expression to get VRF(J) using Equations 5 and 6. As in FIG. 7, if the lithology, fluid type, and porosity of a formation is given, its effective migration length $M^*$ can be computed. These theoretical, vertically infinite $M^*$ values are computed and tabulated in Table 2. However, what is actually needed in order to apply Equation 5 is a single value of $M^*$ for each position of the tool 10 as it collects data across the three inch beds comprising the API neutron test facility. Stated in another way, filter weights must be determined and applied to the tabulated $M^*$ values to produce the observed or aggregate $M^*$. While a number of mixing rules have been examined, the following one yields the best overall agreement between the predicted log and the measured log:

$$\text{AGG } M^*(I) = \text{SQRT}\left[\sum_{K=-6}^{+6} M^*\text{FILTER }(K) \cdot M^{*2}(I + K)\right] \quad (8)$$

where the coefficients M* FILTER (K) are given in Table 3. Examination of the mixing rule filter values in Table 3 shows that, in effect, material nearest the source is more important than material near the detector.

Figure 11:
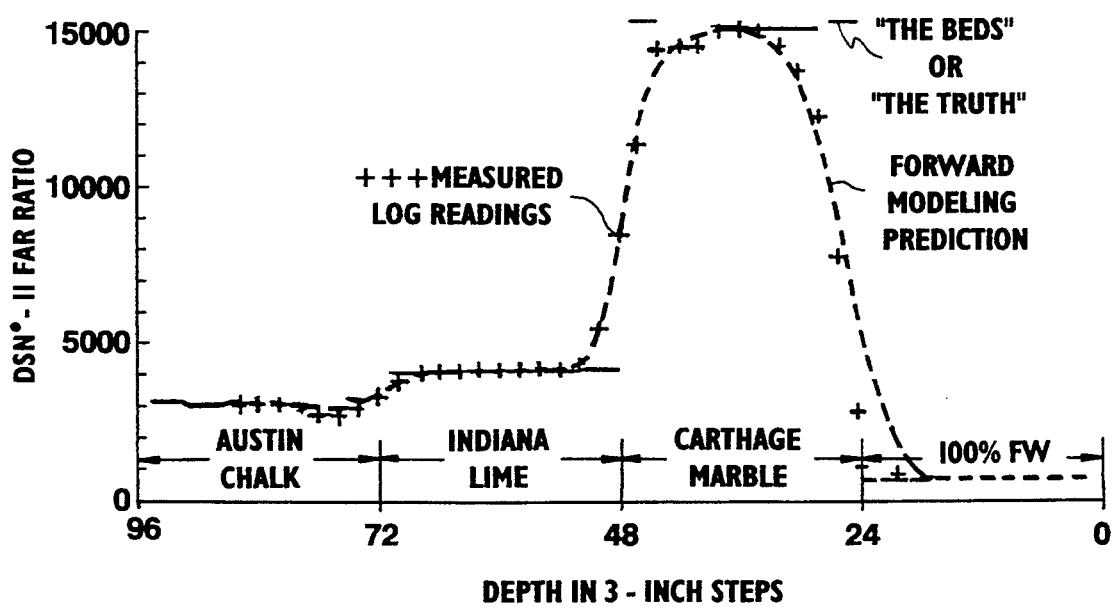
FIG. 11 is a view showing various far neutron detector count rates versus depth in the API standard neutron test pit.

Using these aggregate M* values in Equations 5, 6 and 8 produces the forward modeling predictions shown in FIG. 11. These values compare very favorably with the actual recorded values and indicate that the VRF given by Equation 5 is accurate. Study of FIG. 11 shows very clearly that the correct slopes on entering and exiting both the Indiana limestone and the Carthage marble are correctly modeled. The far detector 4 responds quickly to the marble/water interface. The low porosity Carthage marble "peak" is pushed downhole towards the neutron source 1. Both of these formation features are accurately modeled. Experience shows that the slope of the predicted log is very sensitive to the exact shifting and compression factors of Equation 5, but not as sensitive to the mixing rule (Equation 8). Several practical problems were encountered during the acquisition of the recorded values listed. Near the bottom of the test pit, most of the Austin chalk could not be logged because of an excessively long tool and a lack of a support layer below. Near the very top of the test pit log, it was difficult to maintain the tool flush against the Carthage marble with no standoff when the tool entered into 100% freshwater.

DECONVOLUTION APPLIED TO THE UNIVERSITY OF HOUSTON API NEUTRON TEST PIT FACILITY

The VRF can also be used to deconvolve neutron far detector count rate logs and thereby improve vertical resolution. Again, one problem is how to compute M*. FIG. 6 suggests a simple method for doing this during logging, based on the standard near/far detector ratio (R) obtained by using respective near and far block filters of 9 and 5 (Table 1, second or medium row). Thus a polynomial expansion of the form:

$$M^* = A_0 + A_1 R + \ldots + A_N R^N \quad (9)$$

can be used to get M* from R. One complication is that the coefficients in Equation 9 are based on data measured at standard borehole conditions. Hence, the ratios input to Equation 9 must be corrected for borehole diameter, tool standoff, borehole fluid salinity, etc. so that standard conditions apply, e.g., 8 inch well diameter, decentralized tool, and fresh water filled. During actual logging, after this initial value of M* is used to deconvolve the far detector count rate, a smoothed near/deconvolved far detector ratio is obtained that can be used to iterate this procedure to improve the value of M* and the accuracy of the deconvolution of the far detector count rate log.

A number of deconvolution algorithms have been examined and this remains an active area of research. Results obtained with the traditional Van Cittert deconvolution algorithm have been reported. Denote by LOG(I) the far neutron detector count rates that have been depth-aligned, dead time corrected, and lightly prefiltered with a three-point, symmetrical filter that is heavier at lower count rates and conversely, lighter at higher count rates:

$$\ldots, \text{LOG}(0), \text{LOG}(1), \ldots, \text{LOG}(99), \text{LOG}(100), \ldots \quad (10)$$

These are observed/recorded count rates, i.e., the true vertical response function has already been applied as the tool moved through the well borehole and responded to the beds that are present. The Van Cittert deconvolution algorithm begins by applying the VRF to these log values as if they were now the beds, so that a convolved log is obtained:

$$\text{CONVOLVED LOG }(I) = \sum_{J=-20}^{+20} \text{VRF}(J) \cdot \text{LOG}(I + J) \quad (11)$$

The key assumption of this algorithm is that the shift that is computed between the observed log and the convolved log is the same in magnitude, but opposite in sign, to that obtained when the beds were originally convolved to produce the recorded log. Thus the final expression for the deconvolved log becomes:

$$\text{DECONVOLVED LOG }(I) = 2 \text{ LOG }(I) - \quad (12)$$

$$\sum_{J=-20}^{+20} \text{VRF}(J) \cdot \text{LOG}(I + J)$$

Therefore, a filter which accomplishes the Van Cittert deconvolution algorithm in one step from the original log data is simply:

$$-\text{VRF}(-20), -\text{VRF}(-19), \ldots$$
$$, -\text{VRF}(-1), 2 - \text{VRF}(0), -\text{VRF}(+1), \ldots$$
$$, -\text{VRF}(+19), -\text{VRF}(+20) \quad (13)$$

Since the VRF is never negative and always less than unity, only the center deconvolution filter element is positive.

Another operation that must be supported is the smoothing of the near detector response. Both the smoothed near and the deconvolved far count rates must respond equally to formation changes, i.e., both detectors must remain materially matched. It has been found empirically from analyzing test tank and logging data that a compatible near smoothing function (NSF) is given by $$NSF = e^{-Z^2/M^{*2}} \quad (14)$$

Again Z is the distance from the fixed measure point 13. Although the NSF changes its width (vertical extent) as porosity/M* changes, it remains symmetrical about the fixed measure point 13 because its only purpose is to smooth, not to deconvolve. Other smoothing functions may be used.

Figure 8:
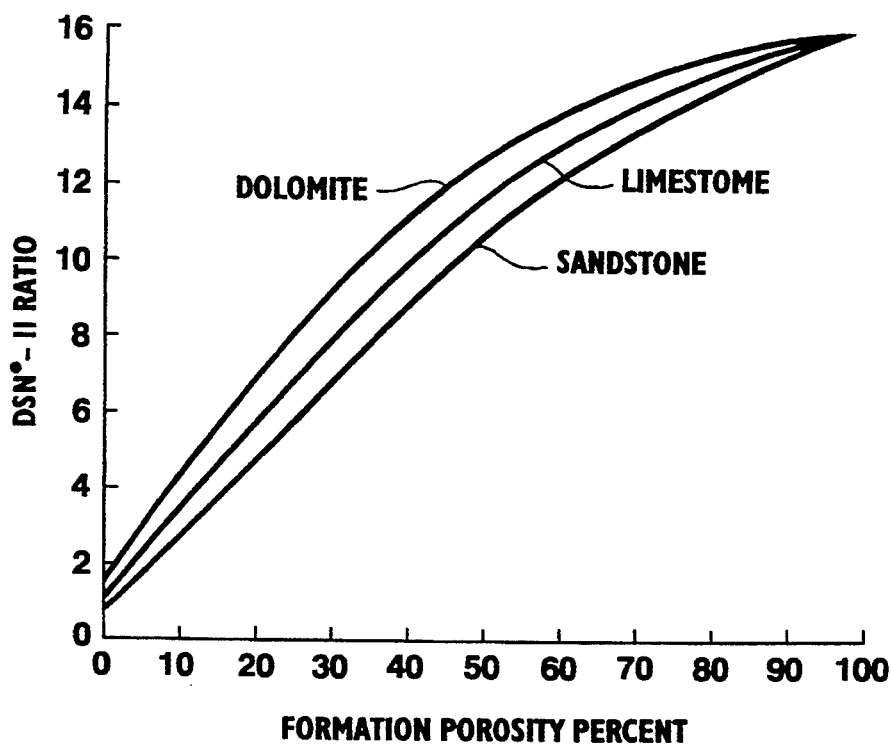
FIG. 8 is a plot of the near to far neutron detector count ratio of a dual spaced neutron logging tool versus formation porosity, again for different formation minerals.
Figure 12:
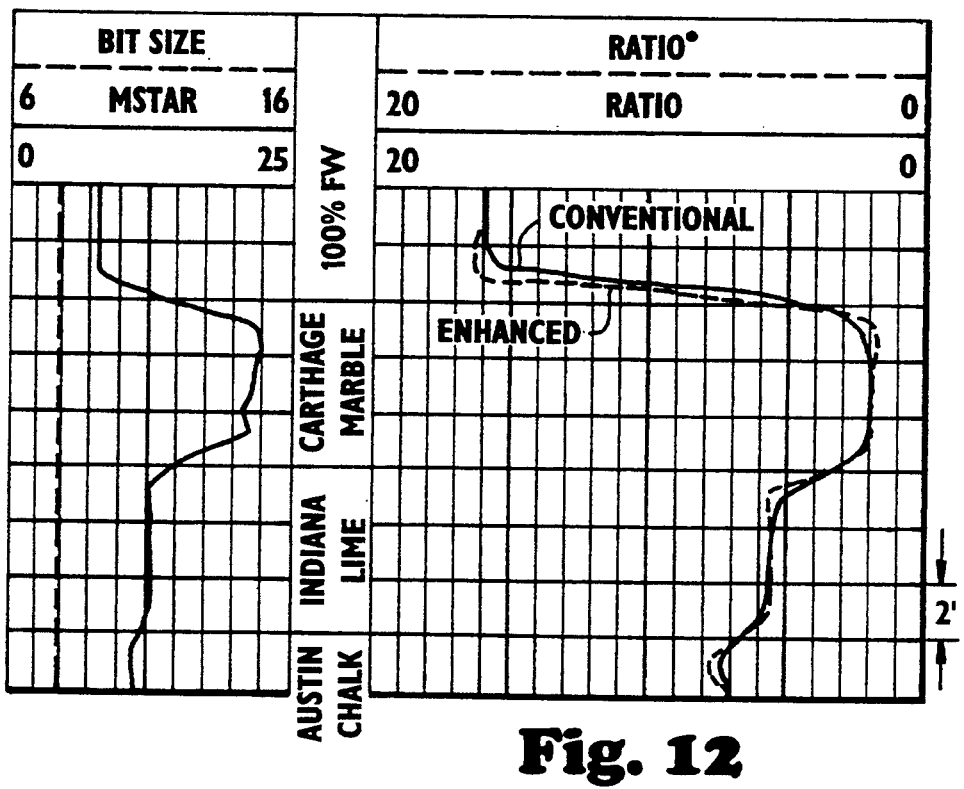
FIG. 12 is a view showing conventional and enhanced processing of the ratio of count rates of the near and far detectors again for the API standard neutron test pit.
Figure 13:
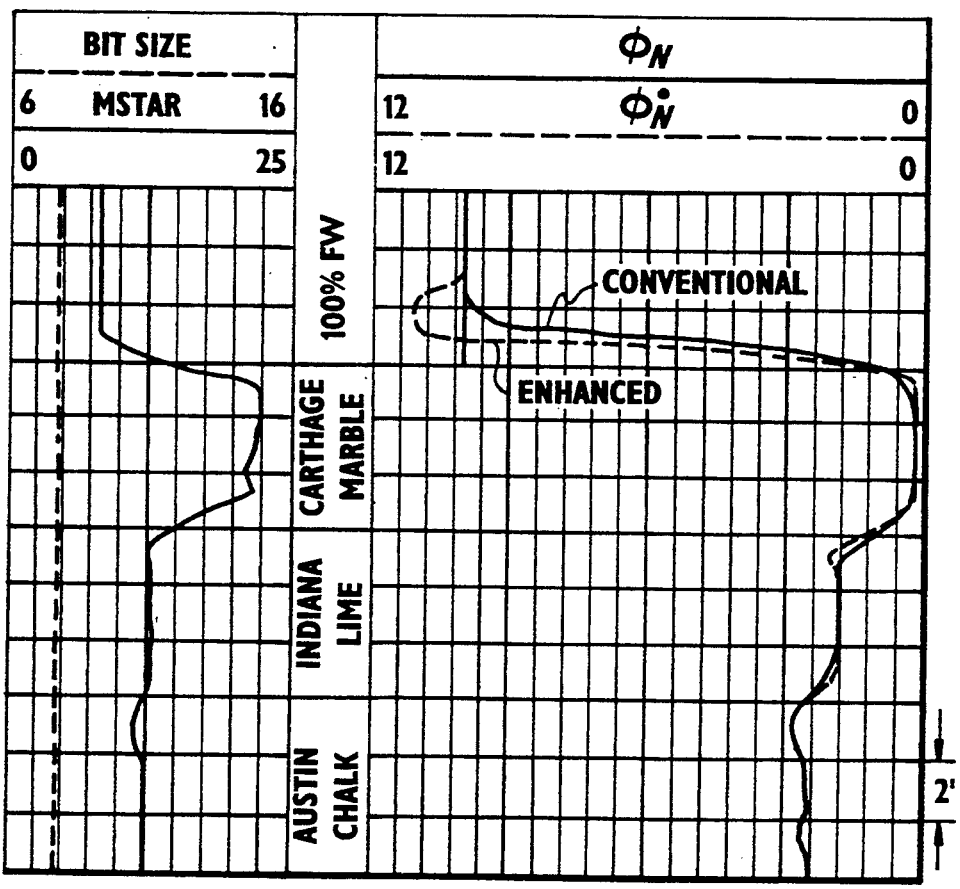
FIG. 13 is a view similar to FIG. 12 showing the corresponding porosity measurements obtained from the API standard test pit.

FIG. 12 shows a comparison between the near/far detector ratio, using standard block filters 9 and 5 for the near and far count rates, and the enhanced vertical resolution (EVR) processed ratio, i.e., smoothed near/deconvolved far. Also shown is M*, as computed using the procedure outlined above. It may be seen that a better job of deconvolution occurs at higher porosities with their associated smaller M* values, and the converse. The Indiana limestone is particularly well resolved, as is the tool entry into 100% fresh water, whereas the Carthage marble formation, with an M* value of about 22 cm, remains poorly resolved. FIG. 13 shows the porosity values corresponding to the ratio values of FIG. 12. The large overshoot on entry into 100% fresh water from the Carthage marble is exaggerated in porosity units because of the severe slope present in the ratio/porosity transform at 100% porosity (FIG. 8).

According to the results shown in FIG. 12, dual-spaced neutron logging tools resolve vertical detail commensurate with the effective migration length M*. This may represent an ultimate barrier to significant improvements in vertical resolution obtainable by any methods.

LOGGING EXAMPLE COMPARING STANDARD AND EVR PROCESSING

FIGS. 14–18 show comparisons between combined gamma. spectral density and neutron logs processed by conventional means and also by using the enhanced vertical resolution processing (EVR) described in this disclosure. In this logging example, hole conditions are very good to excellent. The drilling program did not involve the use of any heavy minerals like barite, so that Pe values in this environment are extremely useful. The logged interval is about 60 meters in extent and 0.1 meter intervals were used both for acquisition and reprocessing. The logged interval is a complex sequence including the Muskeg salts, Keg river dolomites and sands, and the precambrian shield. Anhydrites, shales, and dolomites are present through much of the core reports. An iron nodule may be present near ×491.4 meters.

Figures 14, 15:
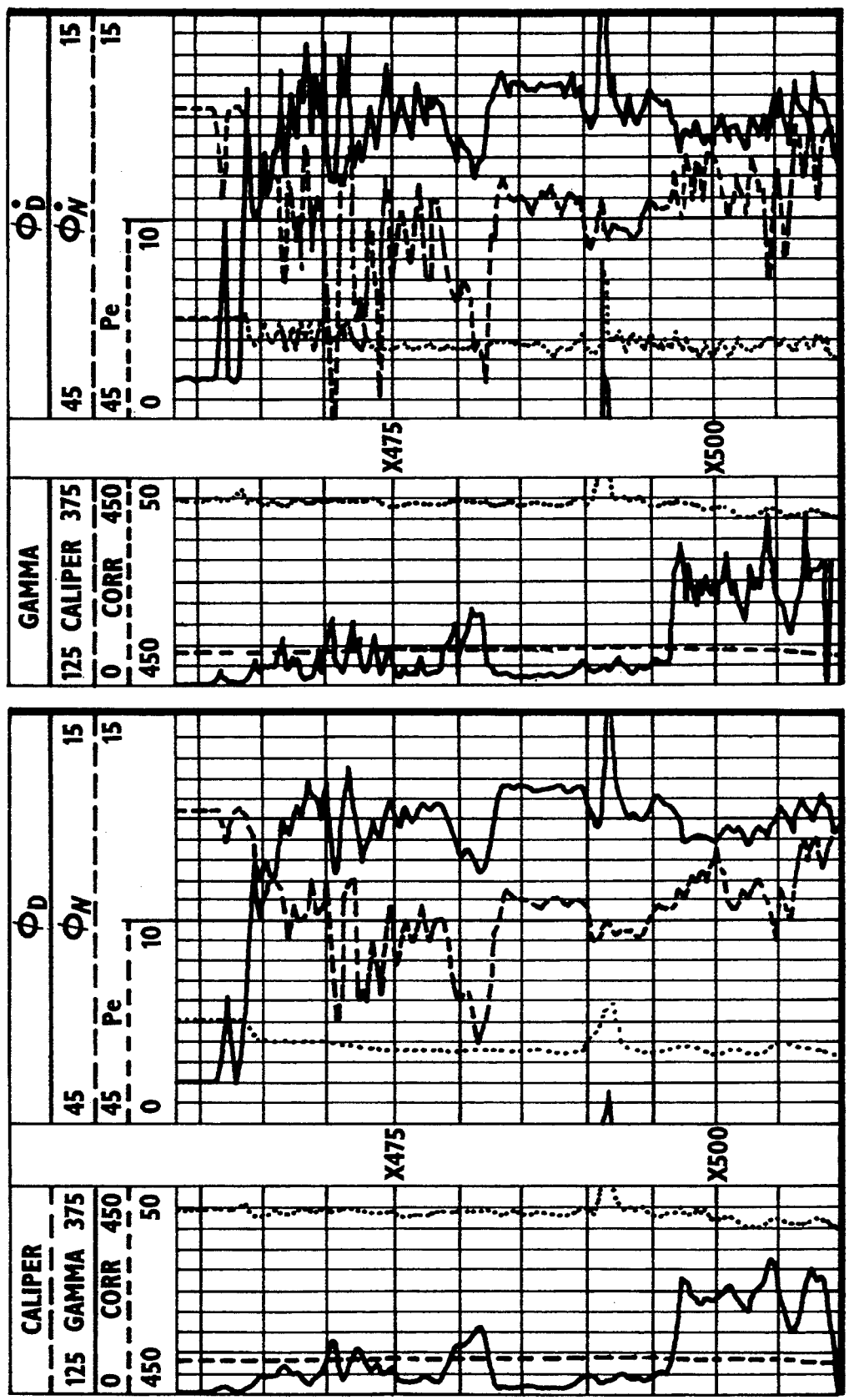
FIG. 14 shows an example of conventional log processing of gamma ray, neutron, and density tool data.
FIG. 15 is a view of the data shown in FIG. 14 processed with the improved procedure of the present disclosure.
Figure 16:
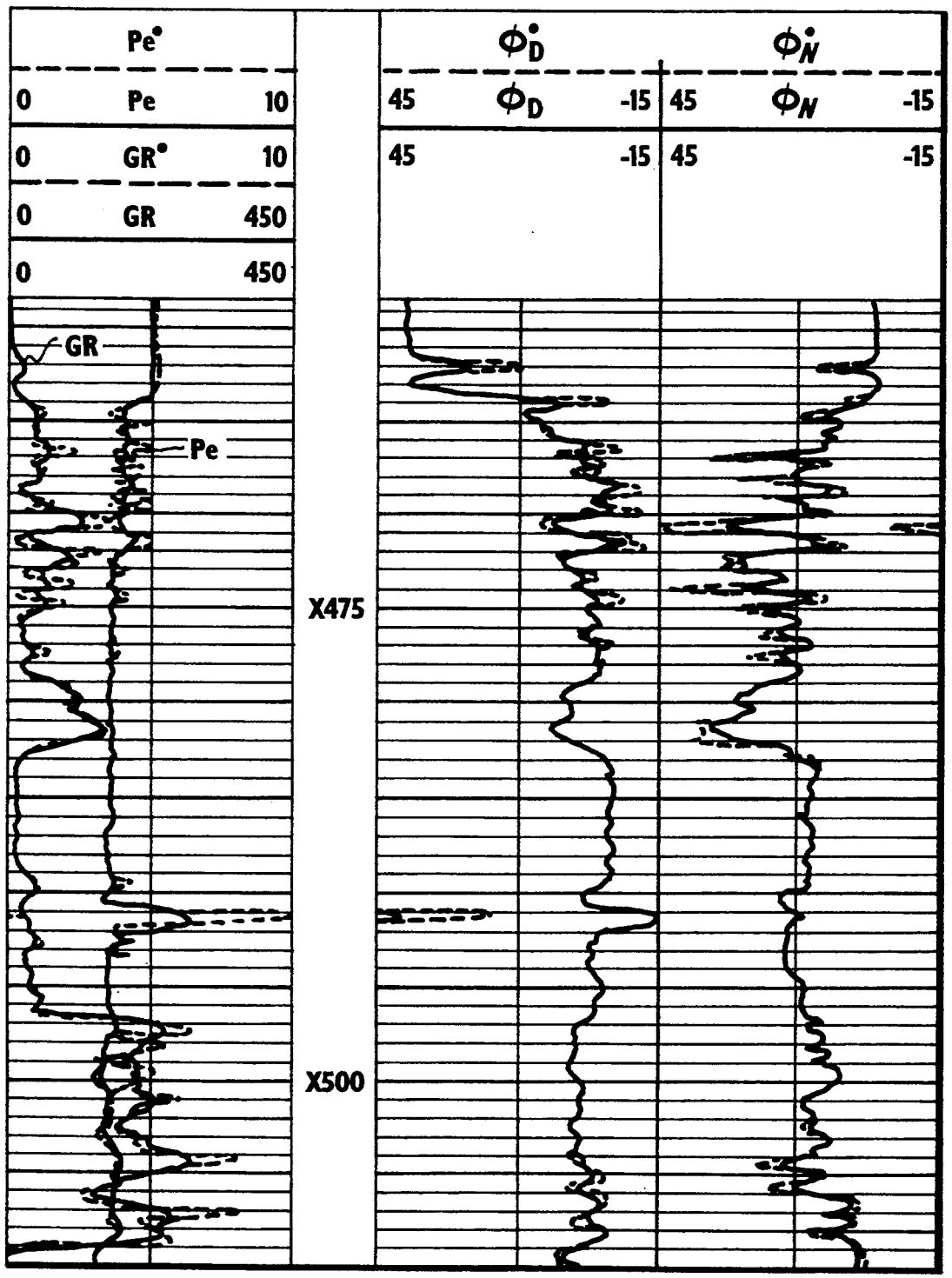
FIG. 16 is a comparison of conventional and enhanced processing in accordance with the present disclosure of data also shown in FIGS. 14 and 15.

FIG. 14 displays the standard processed natural gamma ray spectral density and dual-spaced neutron logs, with block filters as shown in Table 1, second row. FIG. 15 shows the same logs, with EVR processing. The gamma ray log was processed as outlined by known procedures. The short spaced Pe shown is unfiltered and is not strictly material matched to the density and neutron porosity information. Normally, this is done for two reasons. First of all the short spaced Pe values are not used to compute porosity in the manner in which the neutron and density count rates are used. Secondly, the short spaced Pe values really do have exceptional vertical resolution in comparison with any of the other neutron or density count rates. The spectral density log near and far block filters that are compatible with the EVR processed neutron logs are 5 and 3, respectively. FIG. 16 shows curve by curve comparisons between the standard and EVR processing. A considerable improvement in bed resolution is shown in these figures.

Figure 17:
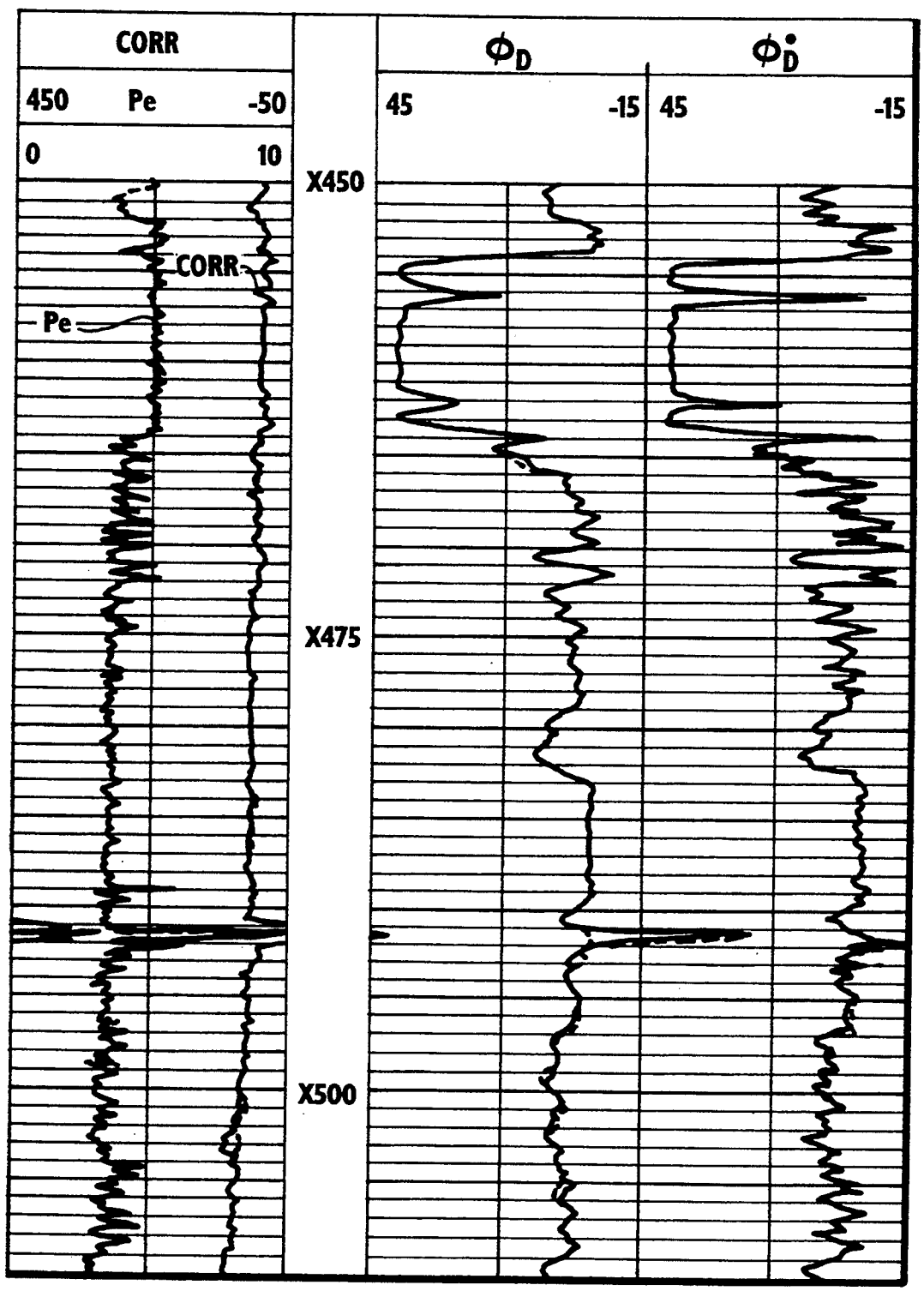
FIG. 17 is an overlay of five separate passes showing benefit of the enhanced density porosity in a log relative to the conventional processing and also showing modest precision/log repeatability losses.
Figure 18:
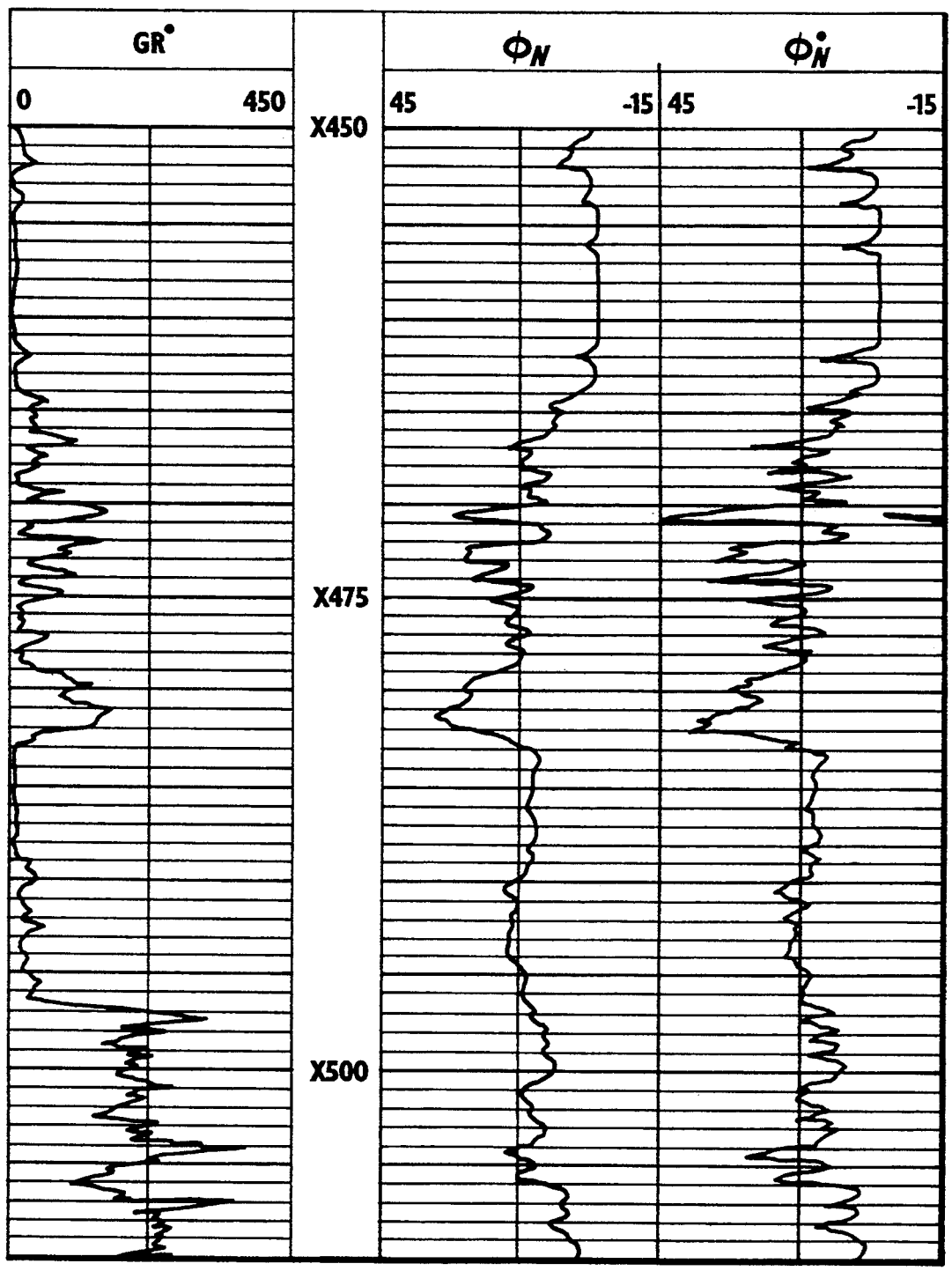
FIG. 18 is a view of a graph showing five separate logging passes showing enhanced gamma ray and neutron logs compared with five conventional neutron logs.

FIGS. 17 and 18 address the tradeoff between vertical resolution improvement and log repeatability degradation. Logging data for five individual passes are plotted, recorded at speeds that ranged from seven to ten meters per minute. In this geological environment, density repeatability is moderate because observed bulk densities are high and count rates are low; the converse is true for the neutron logs. Study of these two graphs shows mat, for many applications, gains in vertical resolution more than offset losses in repeatability. Table 4 summarizes the measured standard deviations obtained from the five repeated runs. These standard deviations include all kinds of errors, not just those due to nuclear statistics. However, the main conclusion from this data is that the EVR processing reduces repeatability by a factor approaching two when compared with standard processing.

FINAL EXAMPLE COMPARING STANDARD AND EVR PROCESSING IN LABORATORY THIN BED TEST FORMATION

Figure 19A:
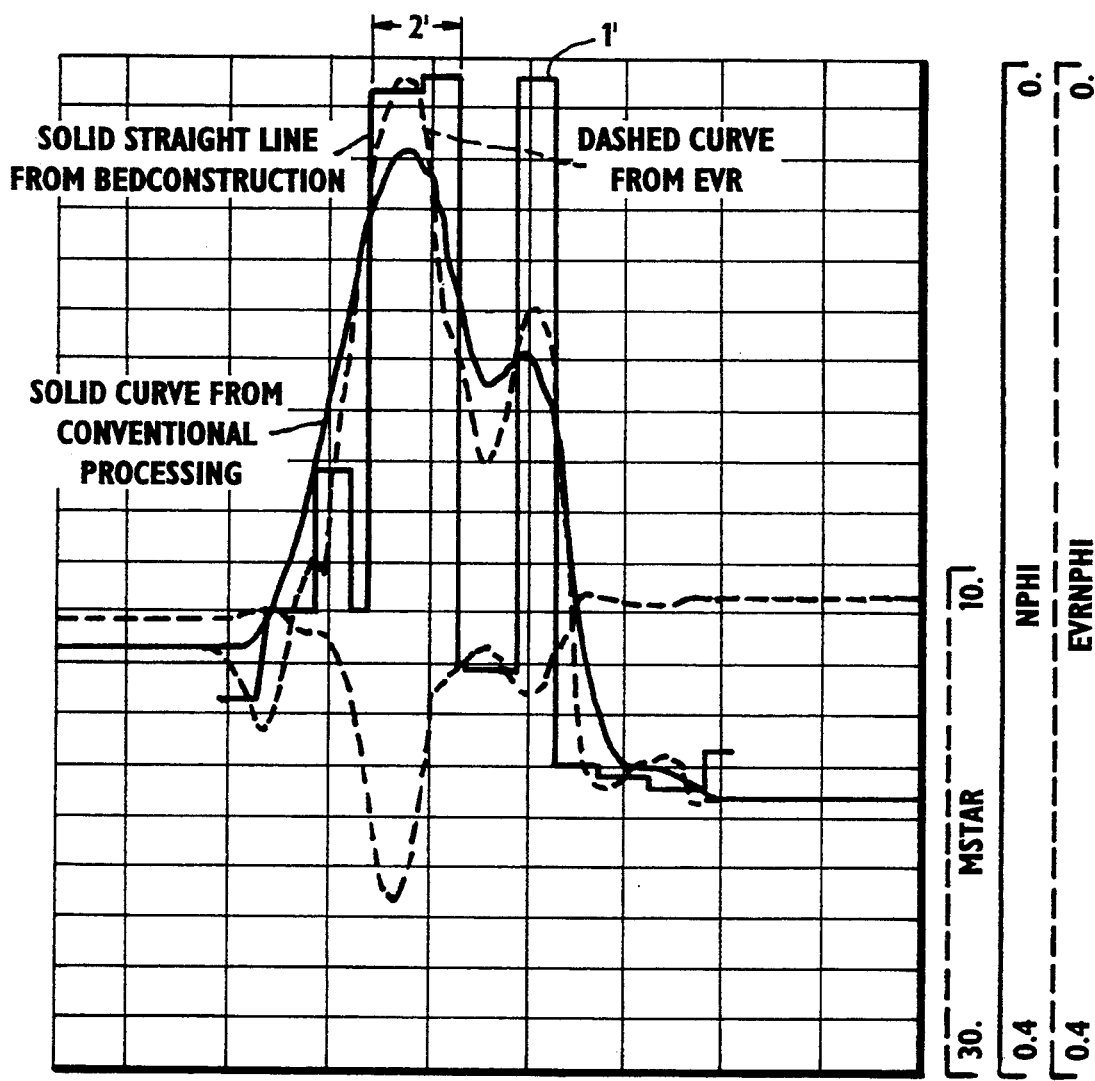
Figure 19B:

FIG. 19 compares standard and EVR processing for a dual-spaced neutron log in a test formation located in Fort Worth, Tex. This test formation was specifically designed to evaluate thin bed log responses. The two foot thick Carthage marble beds with porosity values of 0.7% and 1.6% are resolved by the EVR processing, whereas the standard processed log reads about 4%. Note that the EVR processing cannot resolve the 1 foot Austin chalk bed (24% TRUE, 16% EVR, 13% STANDARD) or the 1 foot Carthage marble bed (0.9% TRUE, 10% EVR, 12% STANDARD); however, in both cases, the EVR processing is more accurate than the standard processing. FIG. 19 also shows the individual near and far count rates that form the EVR ratio used to compute ration porosity in the standard fashion. The alignment and material match between these rates (NEAREVR and FAREVR) is not perfect, but represents a compromise between low and high porosity regimes.

PROCESSING SEQUENCE TO OBTAIN EVR

Figure 20:
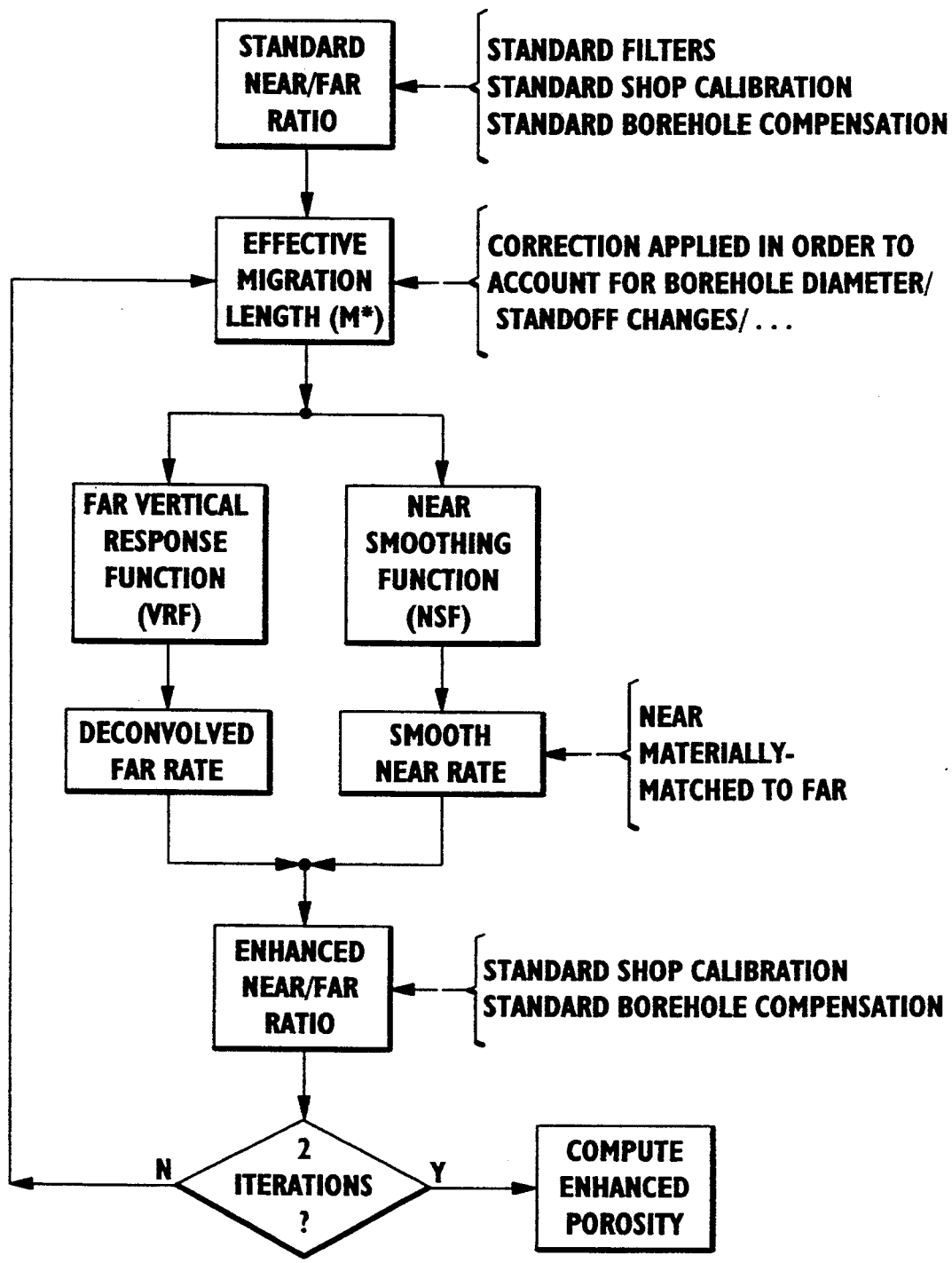
FIG. 20 is a program flow chart for enhanced vertical resolution of data.

FIG. 20 of the drawings shows a block diagram flow chart for handling of data from the near 3 and far 4 detectors. It is directed to a dual-spaced enhanced vertical resolution processing approach utilizing the present disclosure so that the EVR output is an enhanced porosity determination. As shown in FIG. 20, the first step is to determine the count ratio between near and far measurements using standard filters (Table 1, typically "MEDIUM"). From that an effective migration length M* is determined. That will be enhanced by iterative processing. As to the count rate, the far detector vertical response function (VRF) as previously described in Equation 5 is determined. This is done iteratively because it is dependent on the improved value of M*. After the VRF function has been determined, it is used to deconvolve the far neutron detector count rate as disclosed at Equations 9–13. As will be understood from the teachings of the present disclosure, this involves determining the VRF function for a series of measurements and results in a series of output determinations of the deconvolved rate relating to the far detector.

Separately, FIG. 20 shows how the near detector data are handled. Equation 14 yields a near smoothing function (NSF) which is tied to the measure point of the set of tools and the particular deployment utilized. This smoothing function as noted in the foregoing specification is tied to smoothing, not deconvolution, so that the net result is the smoothed NSF output as described. This aids or assists in providing the near detector data sequence. This is used to obtain an enhanced near/far ratio which is processed iteratively as shown in FIG. 20 to continue to improve on the determination of M* which ultimately leads to a computed porosity enhanced by this procedure. The NSF applied to the near detector insures that it is materially matched to deconvolved far detector. Shop calibrations and the borehole compensation method then work properly. Also, no horns/spurious beds appear. In summary, it provides an enhanced porosity measurement capable of noting and responding to thinner beds.

SUMMARY

Preprocessing of dual-spaced density and neutron logging data should include not only depth alignment, but also material matching of all detector responses so that borehole compensation methods can work accurately and extra beds do not appear in the logs; this applies to all standard and enhanced data processing methods. Table 1 lists standard 3-inch block filters for the specific logging tools (gamma, spectral (density) and dual-spaced neutron) that insures that all measurements are materially matched or compatible; excellent log repeatability will be obtained. The current field practice is to use medium filtering, with a vertical resolution of 33–36 inches. The minimum vertical resolution that can be obtained by these standard methods is 21–24 inches, due to the far neutron detector spacing.

The new method has been developed to improve the vertical resolution of dual-spaced far neutron detector measurements to about 12–15 inches. The filtering of the gamma ray, near neutron detector, and both dual-spaced density detectors can be significantly reduced while retaining full vertical compatibility of all measurements, standard shop calibration procedures, and standard dual-detector neutron and density borehole compensation procedures. The new method, called enhanced vertical resolution (EVR) processing, significantly improves vertical resolution while establishing a new compromise with repeatability that will be acceptable in many logging applications. It is anticipated that EVR processing will yield more accurate neutron and density porosity values in rugose boreholes than previous methods based on near detector profiling.

The new method uses the effective neutron migration length $M^*$ to compute the far neutron detector vertical response function VRF given by Equation 5. VRF forward modeling produces accurate results. Use of the VRF with standard Van Cittert deconvolution improves the vertical resolution of neutron logs. EVR neutron deconvolution yields more optimistic porosity values than near detector profiling in several important cases.

Although EVR processing has been proven by reprocessing telemetry tapes for a specific tool, it can be readily be used in real time or playback at the well site.

While the foregoing is directed to the preferred embodiment, the scope thereof is determine by the claims which follow.

TABLE 1

MATERIAL MATCHED BLOCK FILTERS FOR PROCESSING OF GAMMA RADIATION, NEUTRON AND SPECTRAL DENSITY DATA
(all quantities in inches)

| FILTER | GR | DSNss | DSNls | SDLss | SDLls | LENGTH |
|---|---|---|---|---|---|---|
| LIGHT | 15 | 15 | 3 | 21 | 15 | 21–24 |
| MEDIUM | 27 | 27 | 15 | 33 | 27 | 33–36 |
| HEAVY | 39 | 39 | 27 | 45 | 39 | 45–48 |
| ENHANCED RESOLUTION COMPATIBLE FILTERS | | | | | | |
| EVR | 12 (matched) | NSF | VRF | 15 | 9 | 12–15 |

TABLE 2

BASIC DATA FOR THE UNIVERSITY OF HOUSTON API NEUTRON TEST PIT FACILITY
Each row represents a 1 foot slab of formation.
Each 1 foot slab consists of 4 (imaginary) beds, each 3 inches thick.

| POROSITY | M*(cm) | COUNTS/SEC |
|---|---|---|
| 100.0 | 7.8 | 773 |
| 1.5 | 22.3 | 15233 |
| 1.8 | 22.3 | 14976 |
| 1.9 | 21.8 | 14961 |
| 1.7 | 22.0 | 15065 |
| 2.6 | 20.9 | 14389 |
| 1.5 | 22.3 | 15219 |
| 18.5 | 13.0 | 4135 |
| 18.7 | 13.0 | 4098 |
| 18.7 | 13.0 | 4098 |
| 18.9 | 12.9 | 4063 |
| 18.5 | 13.0 | 4135 |
| 19.0 | 12.9 | 4046 |
| 25.0 | 17.0 | 3230 |
| 28.7 | 11.3 | 2717 |
| 25.8 | 11.8 | 3119 |
| 25.4 | 11.9 | 3175 |
| 26.2 | 11.8 | 3062 |
| 25.3 | 11.9 | 3189 |

TABLE 3

FILTER COEFFICIENTS USED TO COMPUTE AGGREGATE $M^*$
The neutron source is located at −4 and the center of the far neutron detector is at +4.
Each entry here represents an interval of 3 inches.
All are normalized to unity.

| | |
|---|---|
| −6 | .01702 |
| −5 | .05106 |
| −4 | 0.27234 |
| −3 | 0.20426 |
| −2 | 0.13617 |
| −1 | 0.10213 |
| −0 | 0.06809 |
| +1 | 0.05106 |
| +2 | 0.03404 |
| +3 | 0.02553 |
| +4 | 0.01702 |
| +5 | 0.01277 |
| +6 | 0.00851 |

TABLE 4

MEASURED STANDARD DEVIATIONS FOR STANDARD AND EVR PROCESSING OF NEUTRON AND DENSITY LOGS
All quantities are stated in porosity units (pu).
The neutron and density data were not obtained at the same depths.

| NPHI | 30 | 16 | 9 | 4 | −2 |
|---|---|---|---|---|---|
| σ(NPHI) | 1.0 | .2 | .2 | .2 | <.1 |
| σ(EVRNPHI) | 2.0 | .5 | .5 | .4 | <.1 |
| DPHI | 40 | 16 | 2 | −4 | |
| σ(DPHI) | .2 | 1.5 | .5 | .3 | |

TABLE 4-continued
MEASURED STANDARD DEVIATIONS FOR
STANDARD AND EVR PROCESSING OF
NEUTRON AND DENSITY LOGS
All quantities are stated in porosity units (pu).
The neutron and density data were not obtained at
the same depths.

| σ(EVRDPHI) | .3 | 2.0 | 1.0 | .7 |

I claim:

1. A method for determining the porosity of earth formations with enhanced vertical resolution wherein the method comprises the steps of:
    (a) moving a logging tool through a well borehole that penetrates plural formations, wherein the logging tool includes a source of fast neutrons and at least two spaced detectors that measure the thermal neutron population in the formations and borehole region surrounding the logging tool and wherein said detectors are spaced from the source by different distances;
    (b) measuring count rate responses from said detectors as a function of tool depth while moving the logging tool though said borehole;
    (c) depth aligning and filtering said count rate responses to produce at least two count rate inputs for a compensated neutron porosity computation;
    (d) computing a value of compensated formation porosity from at least two of said count rate inputs according to a predetermined relationship;
    (e) computing a far detector vertical response function using said compensated formation porosity value and according to a second predetermined relationship;
    (f) deconvolving a far detector count rate response from step (b) by using said vertical response function and according to a third predetermined relationship to obtain a deconvolved count rate response with enhanced vertical resolution; and
    (g) combining said deconvolved far detector count rate response and a near detector count rate response from (b) according to a fourth predetermined relationship to compute a compensated formation porosity with increased vertical resolution.

2. The method of claim 1 wherein at step (b) said count rates are measured at least two times per foot.

3. The method of claim 1 wherein at steps (c) through (g) a porosity indicator may be used, with the objective of obtaining enhanced vertical resolution values for said indicator or said formation porosity or both.

4. The method of claim 3 wherein said indicator is a ratio of two count rates.

5. The method of claim 4 wherein said ratio is at least partially corrected for changes in borehole size and tool standoff.

6. The method of claim 1 wherein at step (c) said depth aligning and filtering involve at least in part material matching of said inputs.

7. The method of claim 1 wherein at step (c) said filtering is sufficient to produce said inputs with relatively good statistical precision and repeatability.

8. The method of claim 1 wherein at step (d) said computing a value of compensated formation porosity involves at least in part applying a standard tool calibration.

9. The method of claim 1 wherein at step (d) said computing a value of compensated formation porosity involves at least in part correcting for variations in borehole size and tool standoff.

10. The method of claim 1 wherein at step (d) said computing a value of compensated formation porosity involves at least in part smoothing such that said porosity has relatively good precision and repeatability.

11. The method of claim 1 wherein at step (e) said second predetermined relationship at least partially involves computing an effective neutron migration length.

12. The method of claim 1 wherein at step (f) said third predetermined relationship involves at least in part prefiltering said far detector count rate response from (b) prior to the deconvolving operation.

13. The method of claim 1 wherein at step (f) said deconvolving a far detector count rate response involves at least in part responses for that detector from step (b) measured at least at three different tool positions while said moving the logging tool through said borehole.

14. The method of claim 1 or 13 wherein at step said deconvolving a far detector count rate response involves in part the van Cittert deconvolution technique.

15. The method of claim 1 wherein said fourth predetermined relationship of step (g) includes at least in part depth aligning and filtering said near detector count rate response from step (b), plus using other predetermined relationships, such that the resultant near detector count rate response is approximately materially matched to the deconvolved far detector response of step (f).

16. The method of claim 1 wherein said fourth predetermined relationship of step (g) includes at least in part determining a near detector smoothing function from the compensated formation porosity of step (d) and other predetermined relationships such that the resulting near detector count rate response is approximately materially matched to the deconvolved far detector response of step (f) for all formation porosities.

17. The method of claim 16 wherein the near detector smoothing function at least partially involves the effective neutron migration length.

18. The method of claim 1 wherein steps (d) through (g) are iterated in order to further enhance the vertical resolution of the porosity of earth formations.

19. The method of claim 1 wherein at Step (g) said combining said deconvolved far detector count rate response and a near detector count rate response from (b) involves the same compensation procedures that are used in step (d).

20. The method of claims 5, 11 or 17 wherein said far detector vertical response function and said near detector smoothing function are computed from an effective neutron migration length M* which is in turn computed from said ratio according to the following steps:
    (a) projecting said ratio back to standard conditions by accounting for said changes at least in borehole size and tool standoff;
    (b) using the projected ration from (a), plus a predetermined relationship involving at least in part theoretical values of M* and measured test formation ratio values, to compute M* at actual formation and borehole conditions.

21. The method of claim 20 wherein said far detector vertical response function depends at least in part on the fixed distance along said logging tool from the center of said fast neutron source to a measure point (LO), on the variable distance long the tool above and below said measure point at which said count rate responses are measured (z), and on the effective neutron migration length (M*).

22. The method of claim 21 wherein said far detector vertical response function (VRF) is given by $$VRF = \frac{1}{\sqrt{4\pi} \, M^*} e - (Z + L_o - 2M^*)^2/4M^{*2}.$$

23. The method of claim 1 wherein said logging tool is either suspended from a wireline, included in a tubing conveyed package, or included in a logging while drilling instrument package as part of the drilling string.

24. The method of claim 17 wherein the near detector smoothing function is given by $$NSF = e^{-z^2/M^{*2}}$$

wherein z is the distance from the measure point and M* is the effective neutron migration length.

25. A method for determining the thermal neutron porosity index of earth formations, the method comprising the steps of:
   passing a logging tool along a well borehole, said logging tool having a neutron source and far and near detectors;
   measuring count rate responses from said detectors of said logging tool in said borehole;
   determining a thermal neutron effective migration length;
   computing a far detector vertical response function;
   computing a near detector smoothing function (NSF);
   deconvolving the far detector count rate response after alignment to obtain a deconvolved far neutron detector count rate response with enhanced vertical resolution by incorporating the far vertical response function;
   smoothing the near detector count rate after alignment to obtain a smoothed near detector count rate using said near detector smoothing function; and
   using said smoothed near detector count rate and the deconvolved far detector count rate data to determine a characteristic of formations adjacent to the well borehole wherein that determination is at least partially dependent on the effective neutron migration length.

26. The method of claim 25 wherein said near detector smoothing function is given by $$NSF = e^{-z^2/M^{*2}}$$

wherein z is the distance from the measure point and M* is the effective neutron migration length.

27. The method of claim 26 wherein the deconvolved far detector count rate data is material matched to the near detector count rate data.

* * * * *

UNITED STATES PATENT AND TRADEMARK OFFICE
CERTIFICATE OF CORRECTION

PATENT NO. : 5,377,105

DATED : December 27, 1994

INVENTOR(S) : Michael P. Smith

It is certified that error appears in the above-indentified patent and that said Letters Patent is hereby corrected as shown below:

Column 1, line 11, delete "dam" and insert therefore --data--.

Column 2, line 24, delete "of" and insert therefore --or--; and line 41, delete "it" and insert therefore --a--.

Column 3, line 30, delete "190" and insert therefore --19--.

Column 7, line 50, delete "to" and insert therefore --of--; and line 57, delete ".", second occurrence and insert therefore --,--.

Column 8, line 40, after "$(M^*)^{-1}$", insert --exp--; and after "$L_o$", delete " = " and insert therefore -- - --.

Column 10, line 29, delete ".", first occurrence, and insert therefore --,--.

Column 12, line 62, after "near/", delete "-".

Column 13, line 19, delete "." and insert therefore --,--; and line 42, after "all" insert --,--.

UNITED STATES PATENT AND TRADEMARK OFFICE
CERTIFICATE OF CORRECTION

PATENT NO. : 5,377,105

DATED : December 27, 1994

INVENTOR(S) : Michael P. Smith

It is certified that error appears in the above-indentified patent and that said Letters Patent is hereby corrected as shown below:

Column 14, line 37, after "that" insert --,--.

Column 18, line 46, delete "Step" and insert therefore --step--.

Signed and Sealed this

Thirteenth Day of June, 1995

Attest:

BRUCE LEHMAN

*Attesting Officer*        *Commissioner of Patents and Trademarks*